United States Patent
Lopes

(10) Patent No.: US 10,660,729 B2
(45) Date of Patent: May 26, 2020

(54) SELF-LIGATING BRACKET WITH CANTILEVER LOCKING BEAM MECHANISM AND OTHER LOCKING ELEMENTS FOR LIGATING SLIDING MEMBERS, AND METHODS OF MAKING AND USE THEREOF

(71) Applicant: Alexandre Gallo Lopes, Ribeirão Preto (BR)

(72) Inventor: Alexandre Gallo Lopes, Ribeirão Preto (BR)

( * ) Notice: Subject to any disclaimer, the term of this patent is extended or adjusted under 35 U.S.C. 154(b) by 0 days.

(21) Appl. No.: 15/354,646

(22) Filed: Nov. 17, 2016

(65) Prior Publication Data

US 2017/0135787 A1 May 18, 2017

Related U.S. Application Data

(60) Provisional application No. 62/257,137, filed on Nov. 18, 2015.

(51) Int. Cl.
*A61C 7/34* (2006.01)
*A61C 7/30* (2006.01)
*A61C 7/28* (2006.01)
*A61C 7/02* (2006.01)

(52) U.S. Cl.
CPC ............ *A61C 7/34* (2013.01); *A61C 7/02* (2013.01); *A61C 7/287* (2013.01); *A61C 7/30* (2013.01); *A61C 7/303* (2013.01)

(58) Field of Classification Search
CPC .. A61C 7/34; A61C 7/02; A61C 7/303; A61C 7/30; A61C 7/287

USPC ..................................................... 433/8–24
See application file for complete search history.

(56) References Cited

U.S. PATENT DOCUMENTS

| 2,548,864 A | 4/1951 | Brusse |
| 2,665,480 A | 1/1954 | Johnson |
| 3,775,850 A | 12/1973 | Northcutt |
| 3,871,096 A | 3/1975 | Wallshein |
| 4,149,314 A | 4/1979 | Nonnenmann |
| 4,260,375 A | 4/1981 | Wallshein |
| 4,373,914 A | 2/1983 | Colbert |
| 4,511,331 A | 4/1985 | Scebold et al. |
| 4,674,137 A | 6/1987 | Girse |
| 4,725,229 A | 2/1988 | Miller |

(Continued)

FOREIGN PATENT DOCUMENTS

| BR | 8600030 U | 9/1986 |
| BR | 8600342 U | 9/1987 |

(Continued)

OTHER PUBLICATIONS

Extended European Search Report of related European Patent Application No. 16199526.1 dated Jul. 3, 2017.

(Continued)

*Primary Examiner* — Matthew M Nelson
(74) *Attorney, Agent, or Firm* — Arent Fox, LLP

(57) ABSTRACT

A self-ligating bracket system comprising a body, an archwire slot receivable for an archwire, and a locking mechanism, the locking mechanism configured to allow a ligating sliding member to move between an open position, such that an archwire may be inserted into and/or removed from the archwire slot, and a closed position, such that an archwire is retained within the archwire slot.

9 Claims, 52 Drawing Sheets

(56) References Cited

U.S. PATENT DOCUMENTS

| | | | |
|---|---|---|---|
| 4,867,679 A | 9/1989 | Rackley | |
| 5,269,681 A | 12/1993 | Degnan | |
| 5,857,850 A | 1/1999 | Voudouris | |
| 5,931,668 A | 8/1999 | Birkel | |
| 6,042,374 A | 3/2000 | Farzin-Nia et al. | |
| 6,071,118 A | 6/2000 | Damon | |
| 6,217,321 B1 | 4/2001 | Kanno | |
| 6,309,214 B2 | 10/2001 | Birkel | |
| 6,325,622 B1 | 12/2001 | Kelly et al. | |
| 6,818,076 B1 | 11/2004 | Farzin-Nia | |
| 8,414,292 B2 | 4/2013 | Lopes | |
| 9,339,353 B2 | 5/2016 | Voudouris | |
| 9,480,541 B2 * | 11/2016 | Falcone | A61C 7/14 |
| 2004/0072117 A1 | 4/2004 | Farzin-Nia et al. | |
| 2008/0113311 A1 * | 5/2008 | Forster | A61C 7/287 433/11 |
| 2009/0155734 A1 * | 6/2009 | Damon | A61C 7/287 433/10 |
| 2010/0112508 A1 | 5/2010 | Lopes | |
| 2010/0178629 A1 * | 7/2010 | Oda | A61C 7/125 433/14 |
| 2010/0196838 A1 * | 8/2010 | Damon | A61C 7/287 433/10 |
| 2011/0086323 A1 | 4/2011 | Wessinger | |
| 2012/0040302 A1 | 2/2012 | Rogers | |
| 2013/0189638 A1 * | 7/2013 | Oda | A61C 7/287 433/10 |
| 2014/0141383 A1 | 5/2014 | Hagelganz et al. | |
| 2014/0178831 A1 * | 6/2014 | Forster | A61C 7/287 433/10 |
| 2014/0205960 A1 * | 7/2014 | Farzin-Nia | A61C 7/20 433/10 |
| 2014/0212828 A1 * | 7/2014 | Falcone | A61C 7/14 433/11 |
| 2015/0216637 A1 * | 8/2015 | Narumi | A61C 7/14 433/8 |
| 2015/0223913 A1 * | 8/2015 | Yick | A61C 7/287 433/10 |
| 2015/0238281 A1 * | 8/2015 | Alauddin | A61C 7/006 433/11 |
| 2018/0008379 A9 * | 1/2018 | Yeh | A61C 7/30 |

FOREIGN PATENT DOCUMENTS

| | | |
|---|---|---|
| BR | 0603521 A | 4/2008 |
| BR | DI6804372-4 F | 10/2009 |
| BR | MU8802474-1 U2 | 7/2010 |
| BR | MU8902352-8 U2 | 6/2011 |
| BR | 20 2012 002849-8 U2 | 3/2014 |
| DE | 299 24 576 U1 | 11/2003 |
| DE | 10 2006 053 215 A1 | 5/2008 |
| FR | 2806618 A1 | 9/2001 |

OTHER PUBLICATIONS

International Search Report of International Patent Application No. PCT/BR2011/000271, 2 pages, dated Sep. 5, 2011.

European Patent Office Action of corresponding European Patent Application No. EP 16 199 526.1, dated Dec. 10, 2018.

* cited by examiner

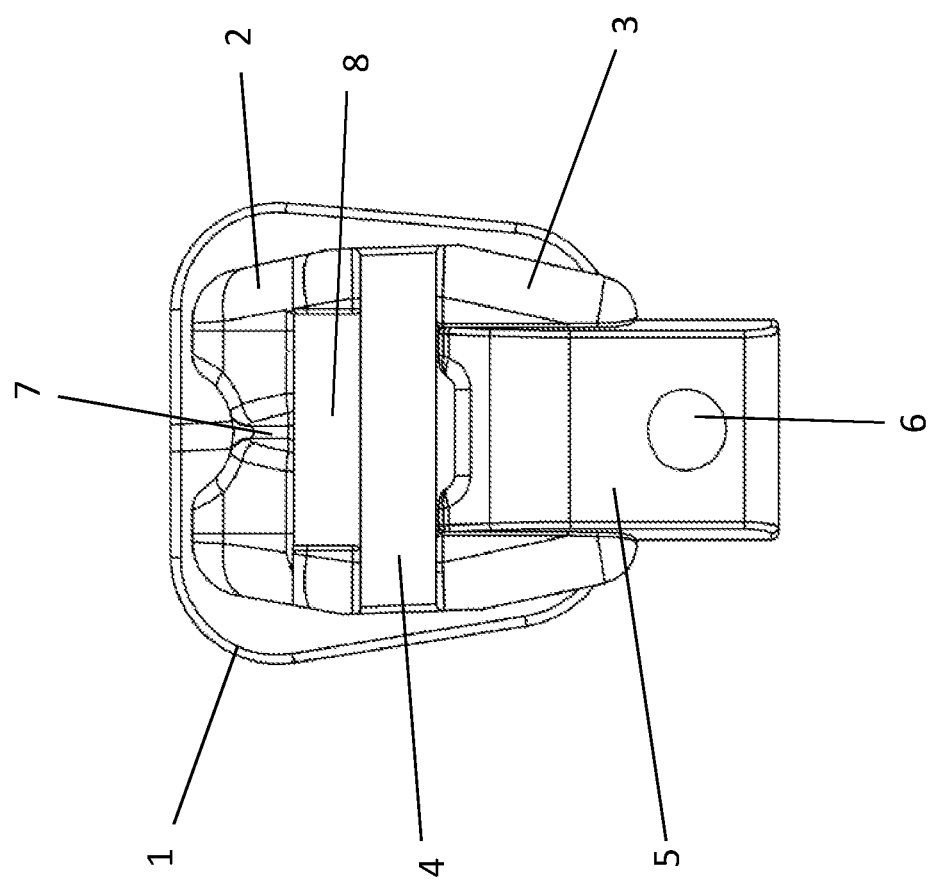

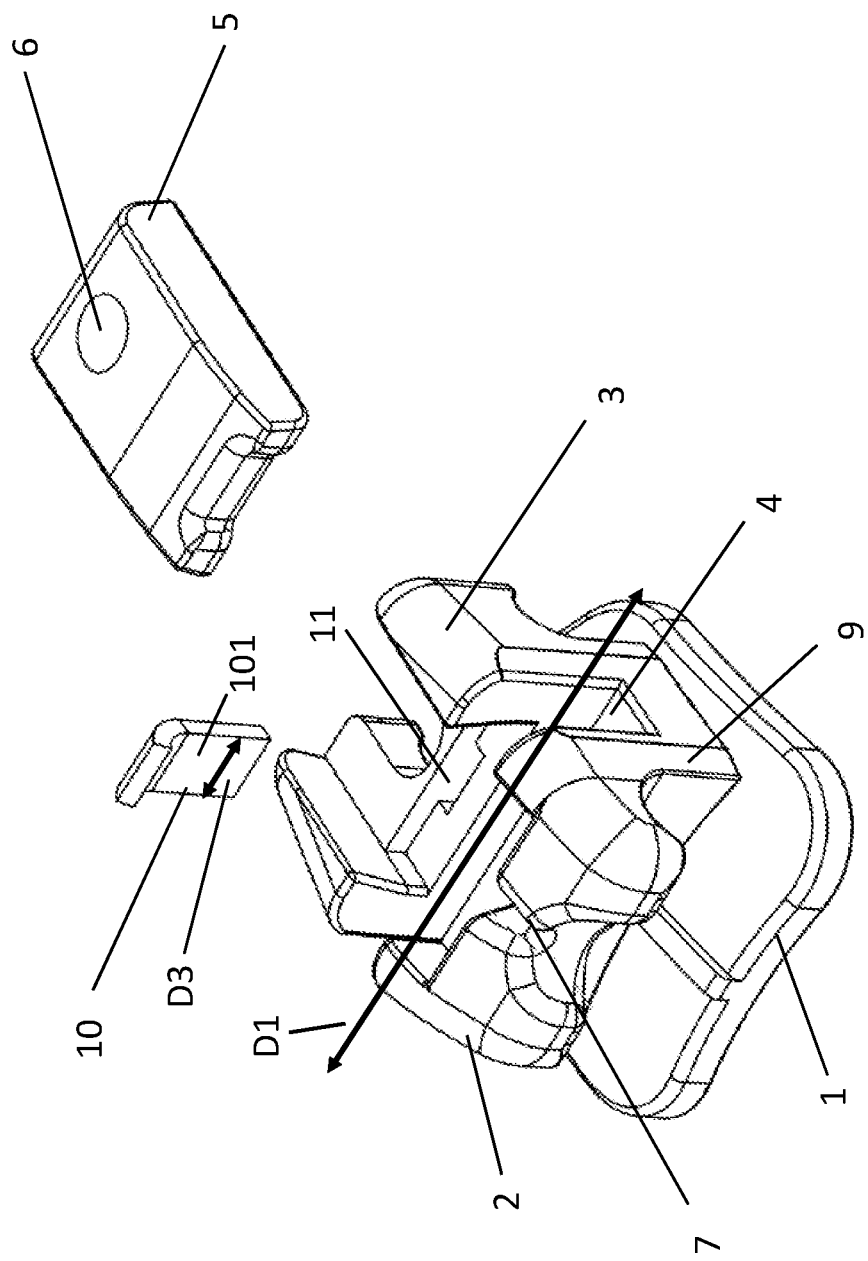

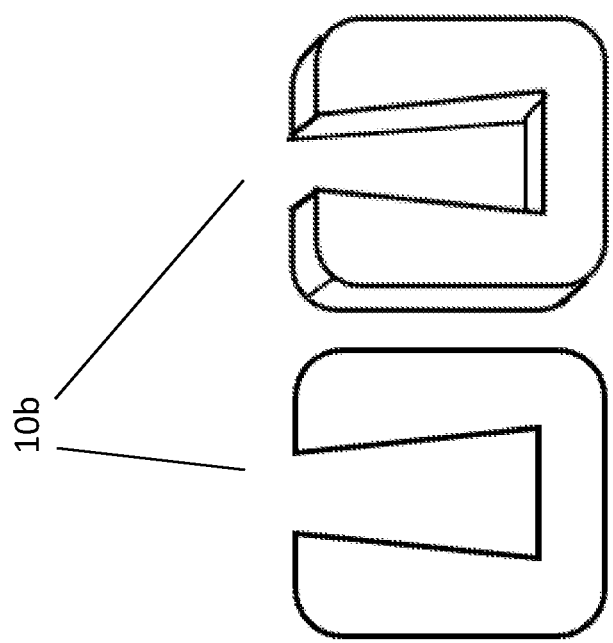

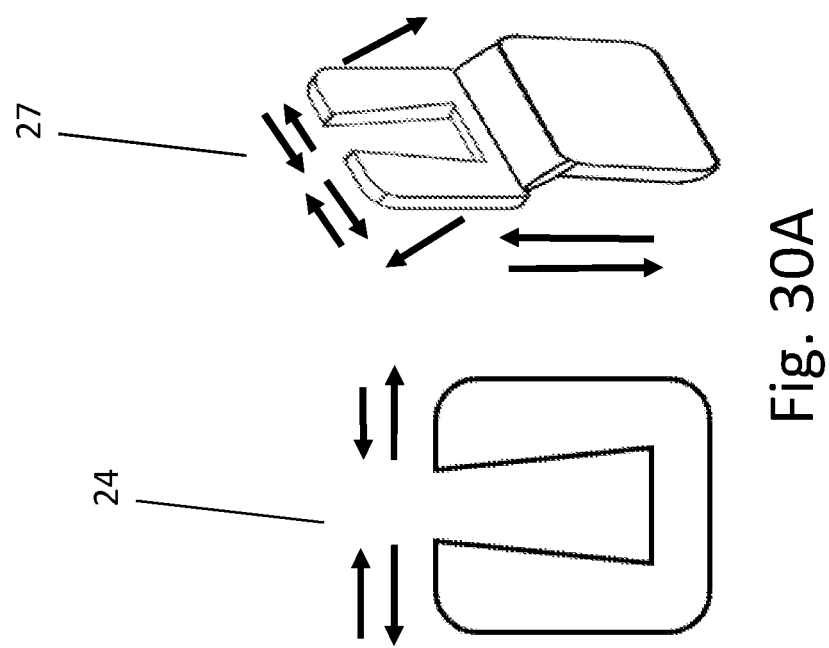

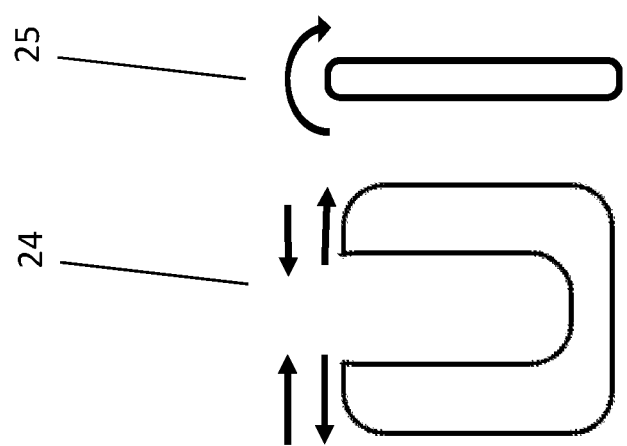

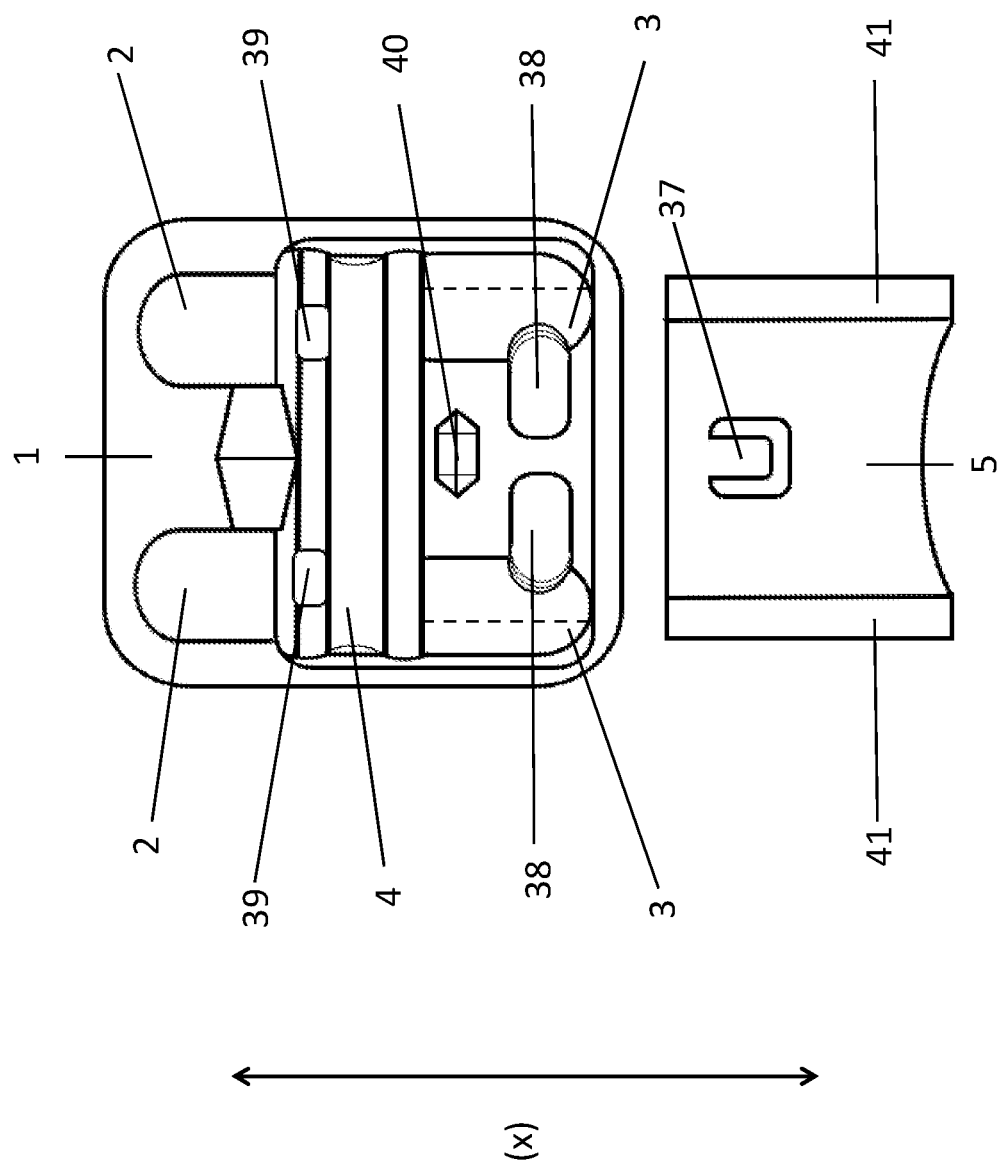

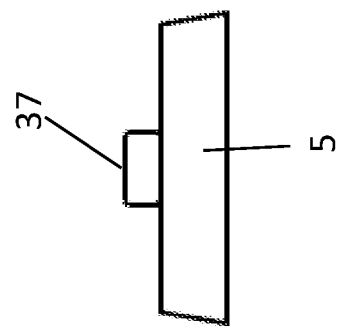
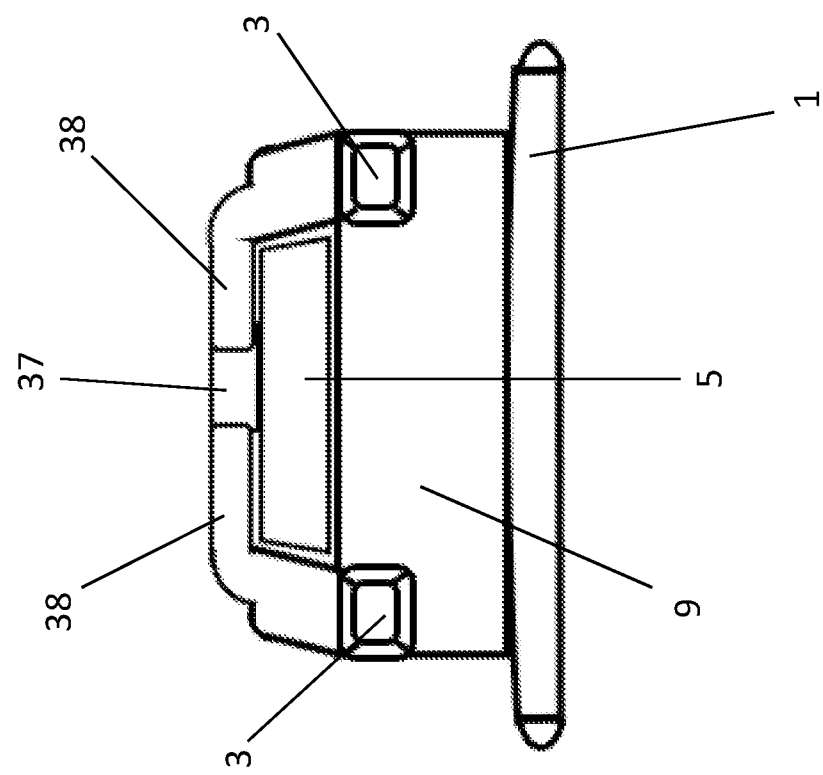
Fig. 34B
Fig. 34A

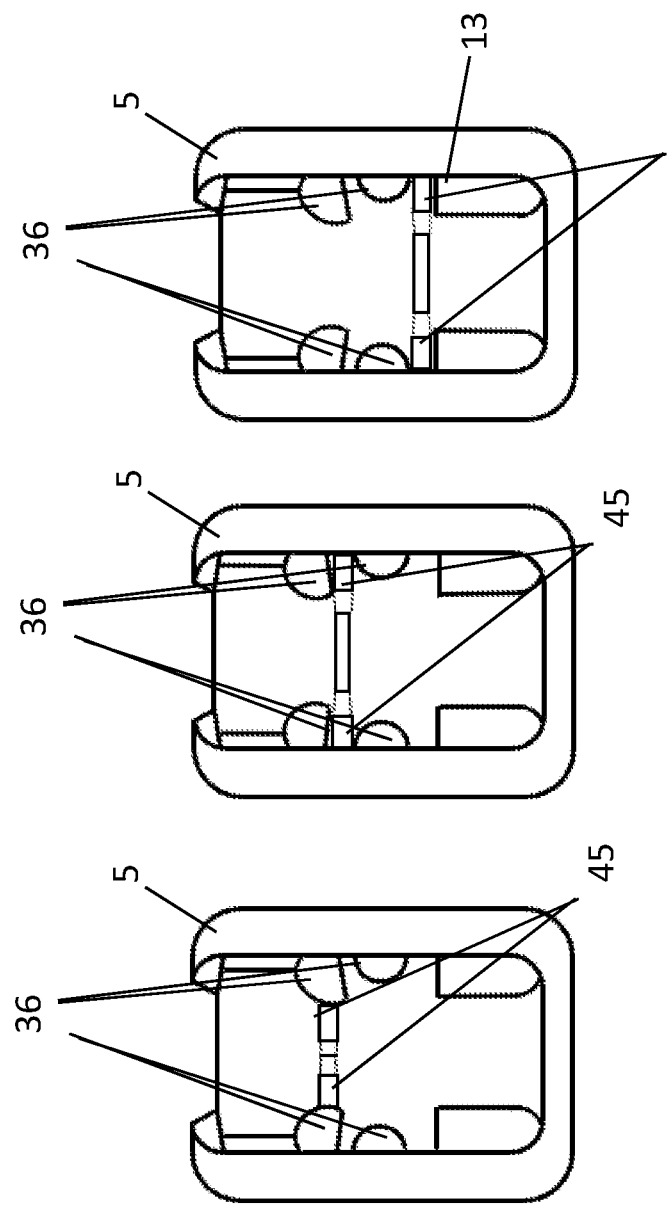

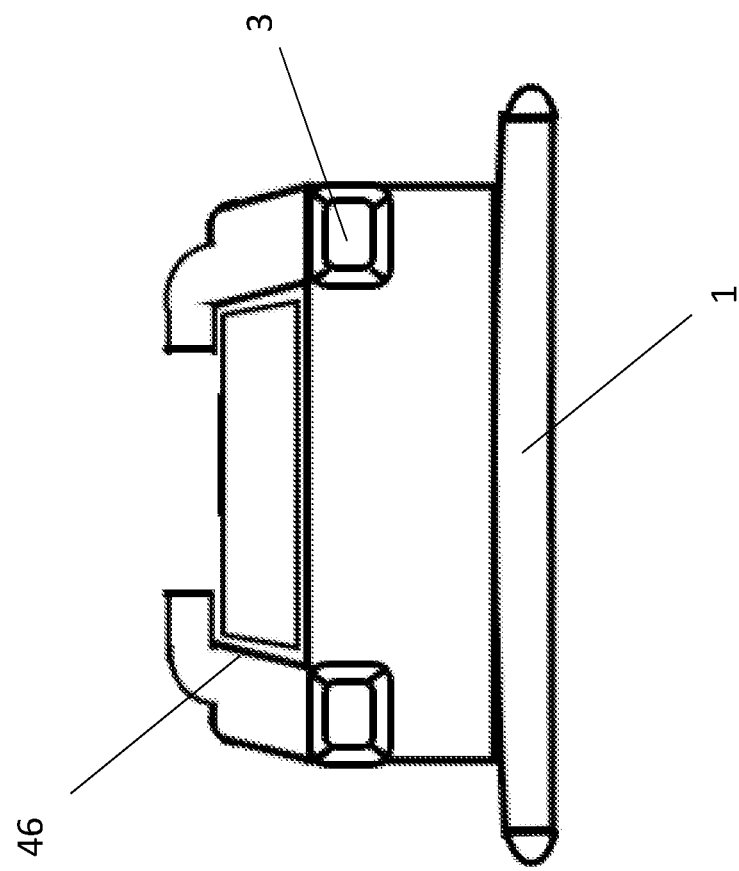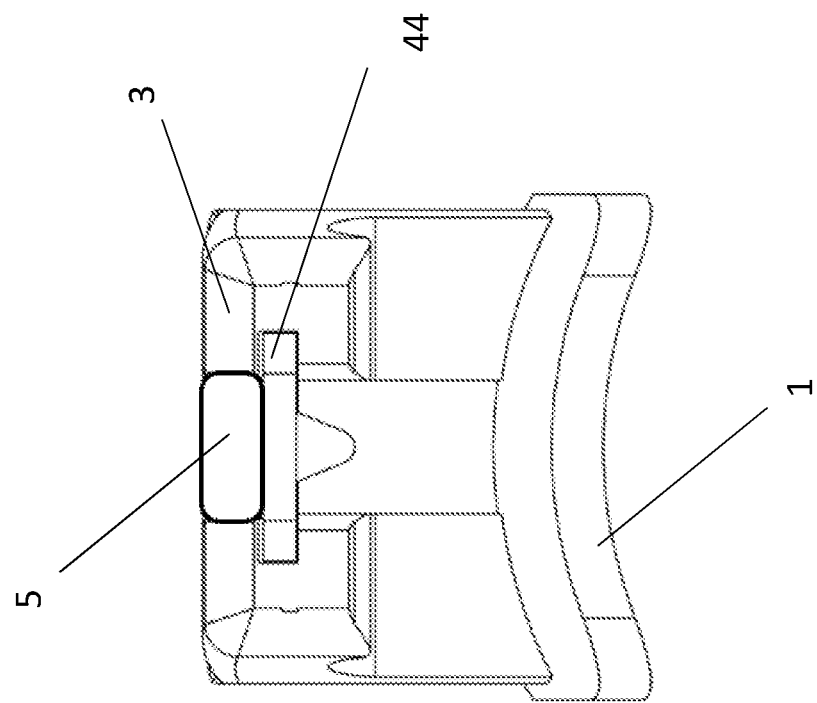
Fig. 38

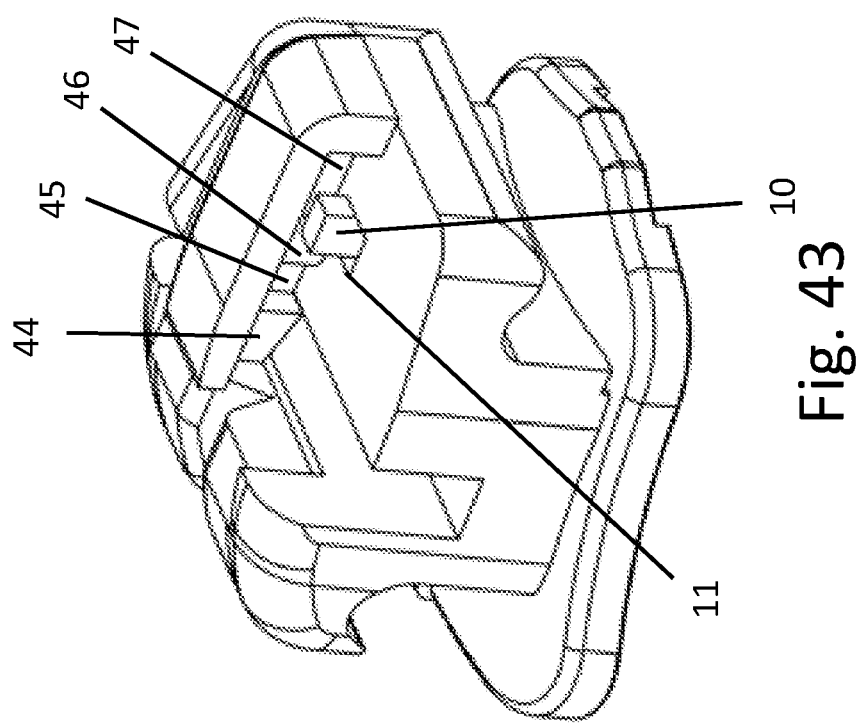

SELF-LIGATING BRACKET WITH CANTILEVER LOCKING BEAM MECHANISM AND OTHER LOCKING ELEMENTS FOR LIGATING SLIDING MEMBERS, AND METHODS OF MAKING AND USE THEREOF

CROSS-REFERENCE TO RELATED APPLICATIONS

This application claims the benefit of U.S. Provisional Patent Application No. 62/257,137, entitled "Self-Ligating Bracket with Cantilever Locking Beam Mechanism and Other Locking Elements for Ligating Sliding Members, and Methods of Making and Use Thereof," filed on Nov. 18, 2015, which is expressly incorporated by reference herein in its entirety.

BACKGROUND

In conventional orthodontic brackets, an archwire applies corrective forces to a patient's teeth in order to move them to an ideal position. The archwire may be received in a slot in a bracket's body and secured within the slot's walls by an elastomeric or steel ligature tie applied to each tooth. However, this approach often results in repetitive and prolonged treatment.

Self-ligating brackets avoid the use of an elastomeric or steel ligature tie, and instead comprise a ligating member, such as a clip, for securing the archwire. One advantage of the self-ligating bracket is a much lower friction at the slot-archwire interface, which allows the use of lower force archwires to move teeth, greatly reducing the iatrogenic potential of the treatment. Eliminating or reducing elastomeric and ligature ties also drastically reduces the repetitive work and the time demanded to change the ligatures.

There is currently a need for new technologies for improving the clinical management and/or functionality of self-ligating brackets.

BRIEF DESCRIPTION OF THE DRAWINGS

FIG. 2 shows an example of a topview of the self-ligating bracket of FIG. 1 with the ligating sliding member in an open position and locked in the lower tie wings, in accordance with aspects of the present invention.

FIG. 3 shows an example of a perspective view of the self-ligating bracket of.

FIG. 1 with the ligating sliding member in a closed and locked position, in accordance with aspects of the present invention.

FIG. 4a shows an example exploded view of the components of the self-ligating bracket of FIG. 1, with the resilient cantilever locking blade with a curved tab and the ligating sliding member, in accordance with aspects of the present invention.

FIG. 29A shows example perspective and top views of a different cantilever locking blade, in accordance with aspects of the present invention.

FIG. 30A shows example perspective and top views of a different cantilever locking blade and its direction of movement, in accordance with aspects of the present invention. FIG. 30B shows example perspective and top views of a cantilever locking blade and its direction of movement, in accordance with aspects of the present invention.

FIG. 33 shows an example exploded top view of a self-ligating bracket with a flexible locking bridge and a ligating sliding member, in accordance with aspects of the present invention.

FIG. 34a shows an example frontal view of a self-ligating bracket with a flexible locking bridge and a ligating sliding member in the closed position, in accordance with aspects of the present invention.

FIG. 34b shows an example frontal view of a ligating sliding member, in accordance with aspects of the present invention.

FIG. 36a shows an example bottom view of a ligating sliding member with protuberances located in a recess, in accordance with aspects of the present invention.

FIG. 36b shows an example bottom view of a ligating sliding member with protuberances located in a recess, in accordance with aspects of the present invention.

FIG. 36c shows an example bottom view of a ligating sliding member with protuberances located in a recess, in accordance with aspects of the present invention.

FIG. 38 shows an example of a dovetail shaped sliding path and "C" shaped sliding path defined by the lower tie wings, in accordance with aspects of the present invention.

FIG. 43 shows an example of a perspective view of a self-ligating bracket with a cantilever locking blade, with a transversal sectional view of the ligating sliding member in the closed position, in accordance with aspects of the present invention.

DESCRIPTION OF THE INVENTION

Figure 1A:
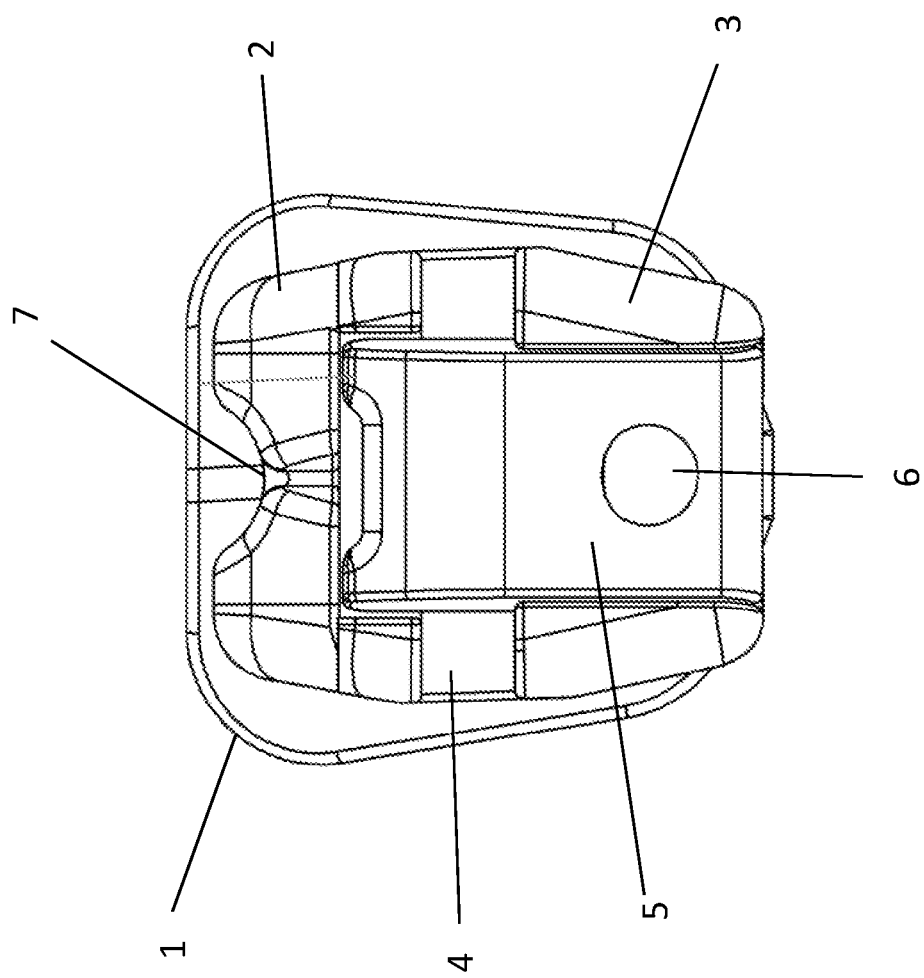
FIG. 1a shows an example of a top view of an example self-ligating bracket with the ligating sliding member in a closed and locked position, in accordance with aspects of the present invention.

Aspects of the present invention relate to a self-ligating bracket system comprising a body, an archwire slot receivable for an archwire, and a locking mechanism. According to some aspects, the locking mechanism may be configured to allow a ligating sliding member to move between an open position, such that an archwire may be inserted into and/or removed from the archwire slot, and a closed position, such that an archwire is retained within the archwire slot.

According to some aspects, the locking mechanism may comprise a ligating sliding member. In some embodiments, the ligating sliding member may comprise a face with concave and/or convex surfaces. In some embodiments, the ligating sliding member may comprise protuberances on a face that is adjacent to the archwire slot. According to some aspects, the face may be substantially planar. According to some aspects, the face may comprise a housing for the protuberances.

According to some aspects, the ligating sliding member may substantially cover the archwire slot when the ligating sliding member is in the closed position, such that an orthodontic archwire is retained in the slot. According to some aspects, the concave and convex surfaces may be on the face of the ligating sliding member, which may be located adjacent to the archwire slot.

According to some aspects of the present invention, the ligating sliding member may be manufactured with a biocompatible material, such as metal alloys (e.g., stainless steel, chromium cobalt, polymers, hybrid polymers, composites, ceramics, hybrid ceramics, and any other material suitable to be used in the oral environment). According to some aspects, the ligating sliding member may be manufactured by processes such as MIM, CIM, PIM, microcasting, injection molding, 3D printing, SLA (additive manufacturing), stamping and forming, and/or any other process that can produce a highly robust and mechanical member. According to some aspects, the ligating member may be manufactured with metal, ceramic, composites, hybrid polymers, and/or plastics with biocompatibility and mechanical requisites in order to withstand the forces and chemistry of the oral environment.

According to some aspects, the locking mechanism may also comprise a resilient shape cantilever locking blade. According to some aspects, the cantilever locking blade may interact with the ligating sliding member.

According to some aspects, the locking mechanism may be manufactured individually as components to be mounted on a body of the bracket. According to some embodiments, the locking mechanism may be manufactured by processes such as stamping, forming, forging, injection molding, 3D printing, SLA, and/or as an integral part of the body and/or part of the ligating sliding member. According to some aspects, manufacturing methods for these versions of bracket bodies and ligating sliding members include MIM, CIM, SLA, 3D printing, microcasting, plastic injection molding, polymer and composite injection molding, and any other known and effective technology utilized in the art.

According to some aspects, the self-ligating bracket system may comprise a body with a bonding base which is configured to be attached to a patient's tooth. According to some aspects, the body may comprise a housing which is substantially perpendicular to the archwire slot. The housing may have, for example, a rectangular recess with the larger width extending in the coronal/apical direction. According to some aspects, the recess may be located in a lower portion of the body and may be configured to receive part or parts of the locking mechanism, for example, the cantilever locking blade.

According to some aspects, the body may comprise similar or different material characteristics, requisites, and manufacturing processes as the ligating sliding member. For example, the body may be manufactured with a biocompatible material, such as metals alloys (e.g., stainless steel, chromium cobalt, polymers, hybrid polymers, composites, ceramics, hybrid ceramics, and any other material suitable to be used in the oral environment). According to some aspects, the body may be manufactured by processes such as MIM, CIM, PIM, microcasting, injection molding, 3D printing, SLA (additive manufacturing), stamping and forming, and/or any other process that can produce a highly robust and mechanical element. According to some aspects, the body may be manufactured with metal, ceramic, composites, hybrid polymers, and/or plastics with biocompatibility and mechanical requisites in order to withstand the forces and chemistry of the oral environment.

According to some aspects, the bracket body may comprise at least two upper tie wings and two lower tie wings.

Figure 1B:
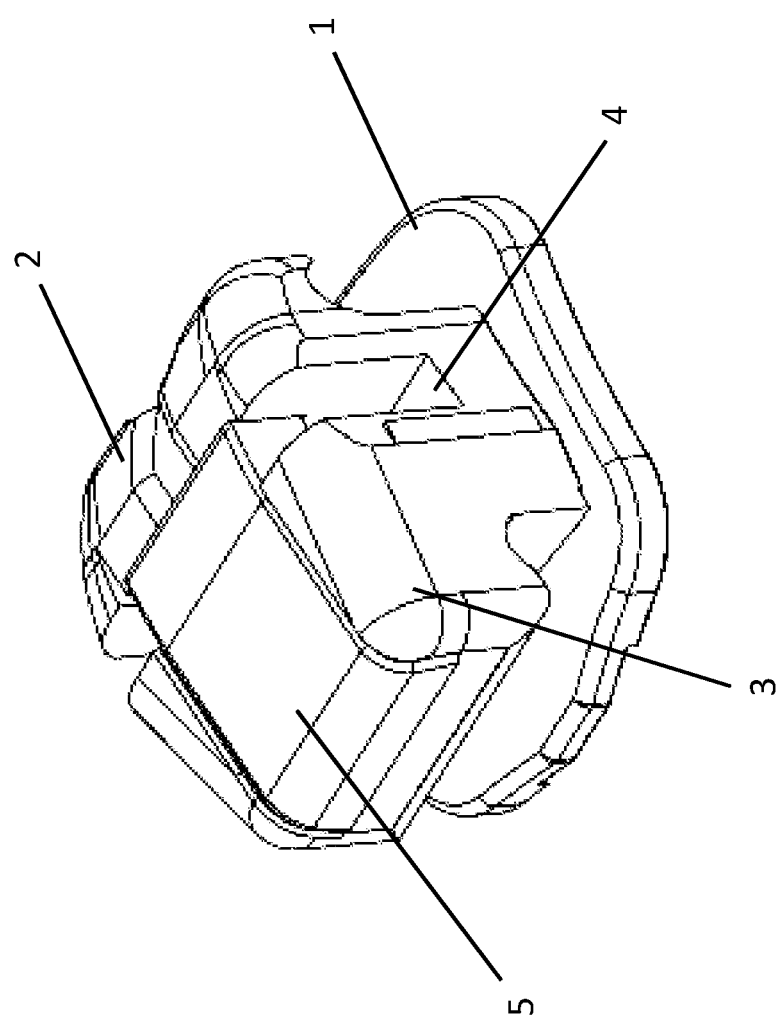
FIG. 1b shows an example of a perspective view of an example self-ligating bracket with the ligating sliding member in a closed and locked position, in accordance with aspects of the present invention.

As shown in FIGS. 1a and 1b, according to some aspects, the self-ligating bracket system may comprise a body with a bonding base (1), two upper tie wings (2) divided by a V-channel (7), and two lower tie wings (3). According to some aspects, the V-channel may function as a visual aid when positioning the bracket system on a tooth and/or when using an instrument to guide the bracket system when bonding the bracket system to a tooth.

According to some aspects, the lower tie wings (3) may define a sliding path receivable for the ligating sliding member (5). According to some aspects, the sliding path may be shaped in a generally dovetail or "C" configuration in a cross-sectional view facing toward the center of the system. Example aspects of the dovetail shaped sliding path (46) and the "C" configuration (44) may also be seen, for example, in FIG. 38.

Figure 15:
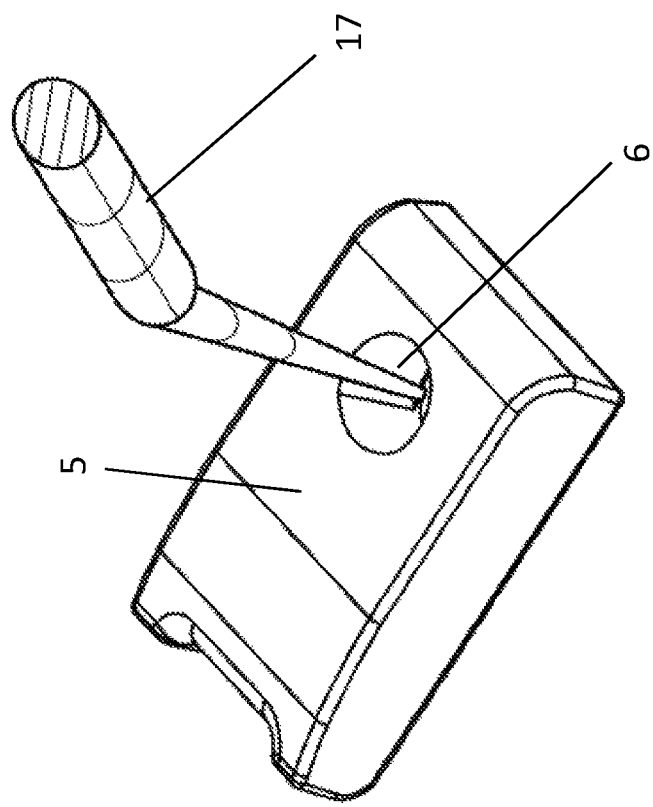
FIG. 15 shows a perspective view of the side of the ligating sliding member of FIG. 13 showing the through hole for inserting the opening instrument and with an opening instrument positioned, in accordance with aspects of the present invention.

Turning back to FIGS. 1a and 1b, the archwire slot (4) may be located between the upper tie wings (2) and lower tie wings (3), and may be substantially covered by the ligating sliding member (5) when the ligating sliding member (5) is in the closed position. According to some aspects, as shown in FIG. 1a, the ligating sliding member may comprise a through hole (6) which is receivable for an instrument. As shown in FIG. 15, the instrument (17) may positioned in the through hole (6) in order to move the ligating sliding member (5) between open and closed positions. As shown in FIG. 1b, the ligating sliding member may also be solid, i.e., devoid of such through hole.

Figure 3:
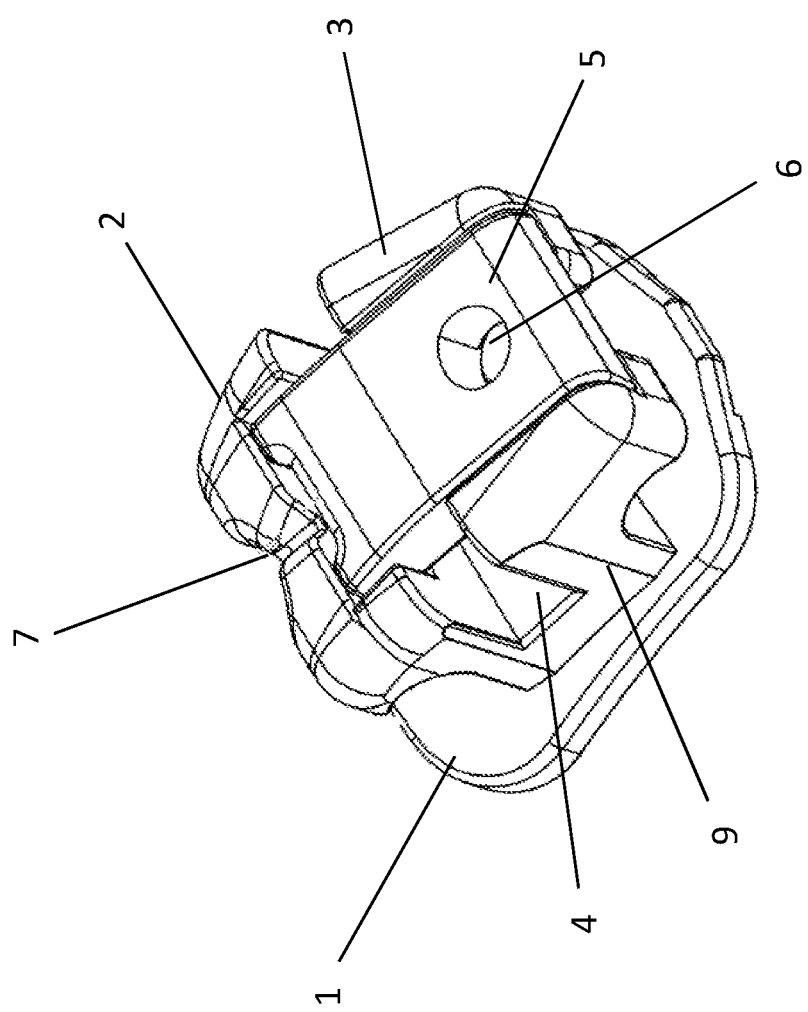

As shown in FIGS. 2 and 3, according to some aspects, the ligating sliding member (5) may be moved between an open position (as shown in FIG. 2) and a closed position (as shown in FIG. 3). The body (9) may comprise a platform (8) proximal to the archwire slot (4) and the upper tie wings (2), which may interact with the ligating sliding member (5)

when the ligating sliding member (5) is in the closed position. For example, the platform (8) may be configured to receive the ligating sliding member (5) in the closed position, and allow the ligating sliding member (5) to interact with the body (9).

Figure 4B:
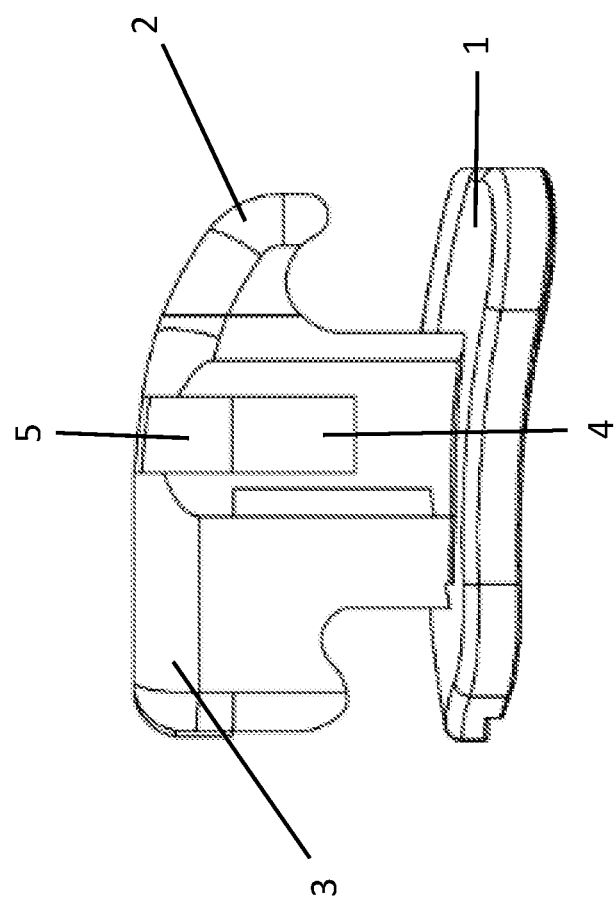
FIG. 4b shows an example transversal lateral cut view of the self-ligating bracket of FIG. 1, in accordance with aspects of the present invention.

As shown in FIG. 4, according to some aspects, the body (9) may comprise a housing (11) configured to receive a cantilever locking blade (10). For example, in one example embodiment shown in FIG. 4a, the housing (11) may be configured such that a face (101) of the cantilever locking blade (10) is parallel to the length of the archwire slot (4), that is, in direction [D1]. As shown in FIG. 4a, the face (101) has a width corresponding to the width [D3] of the cantilever locking blade (10).

Figure 4C:
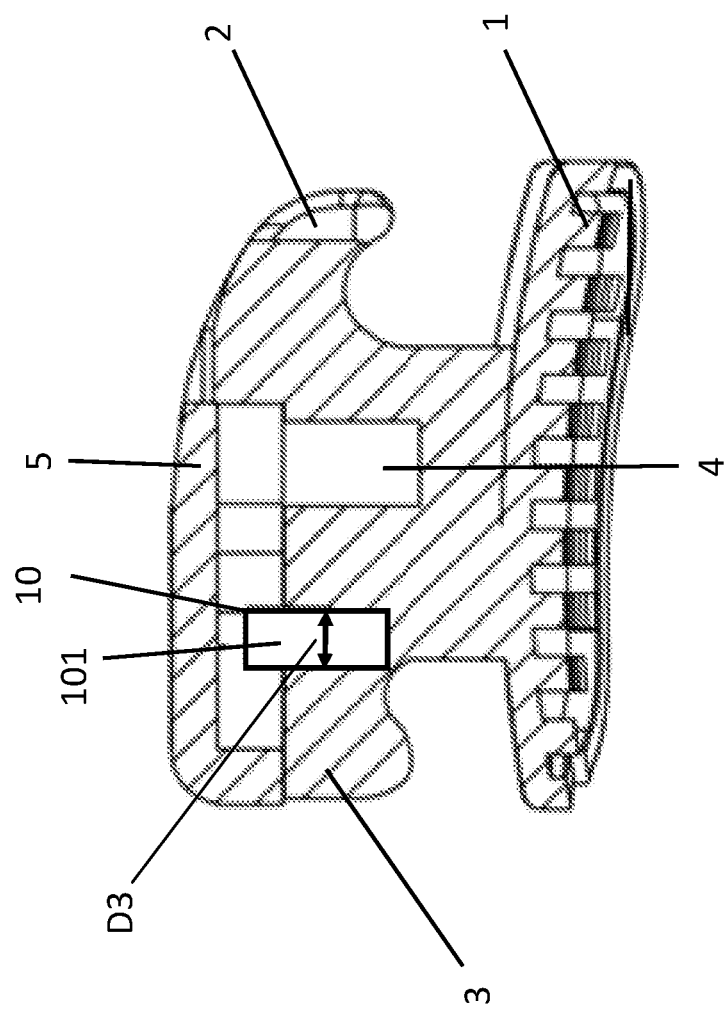
FIG. 4c shows an example transversal lateral cut view of the self-ligating bracket of FIG. 1 with the ligating sliding member in a closed position and the cantilever locking blade having a face perpendicular to the length of the archwire slot, in accordance with aspects of the present invention.
Figure 5:
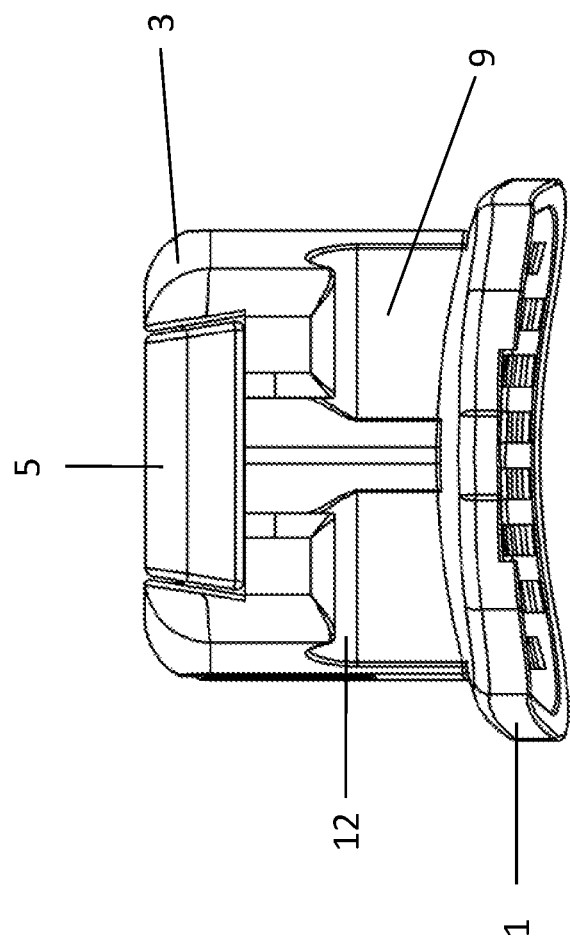
FIG. 5 shows an example of a frontal view of the lower tie wings of the self-ligating bracket of FIG. 1 with the ligating sliding member in a closed position and inside the dovetail shaped sliding path, in accordance with aspects of the present invention.
Figure 6:
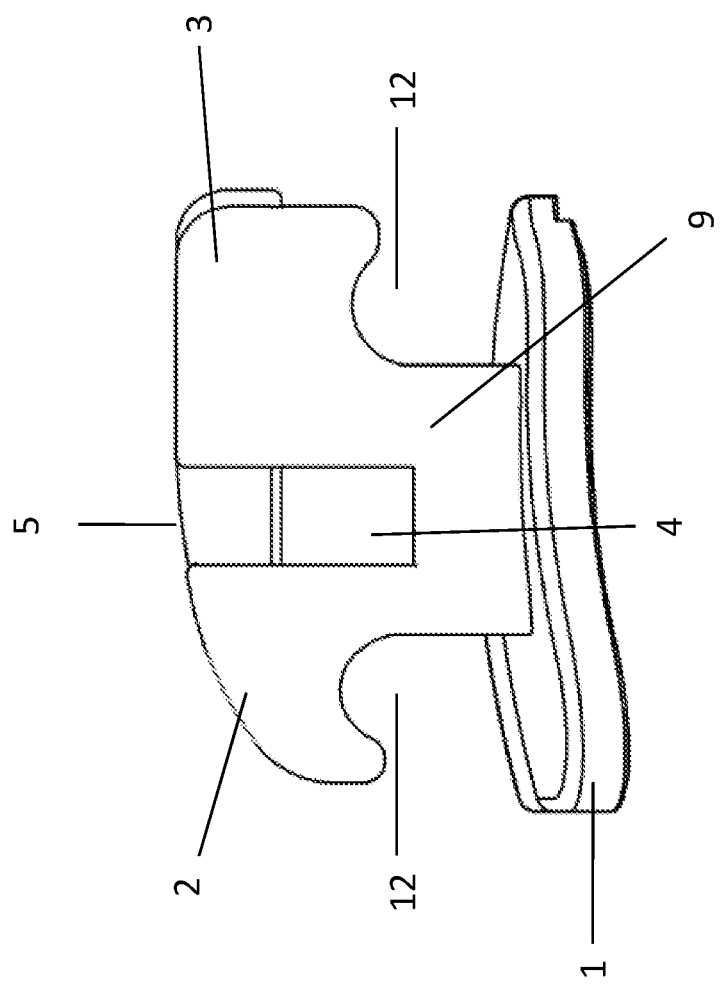
FIG. 6 shows an example of a lateral view of the self-ligating bracket of FIG. 1 with the ligating sliding member in a closed position, in accordance with aspects of the present invention.

In an alternative example embodiment shown in FIG. 4c, the housing may be configured such that the face (101) of the cantilever locking blade (10) extends in a direction perpendicular to the length of the archwire slot (4). As will be discussed in more detail below (see, for example, FIGS. 39-44), this configuration may allow the cantilever locking blade (10) to move in the mesial and/or distal direction (i.e., parallel to the length of the archwire slot (4)).

According to some aspects, the cantilever locking blade (10) may comprise a curved tab that may be configured to interact with the ligating sliding member (5).

Figure 7:
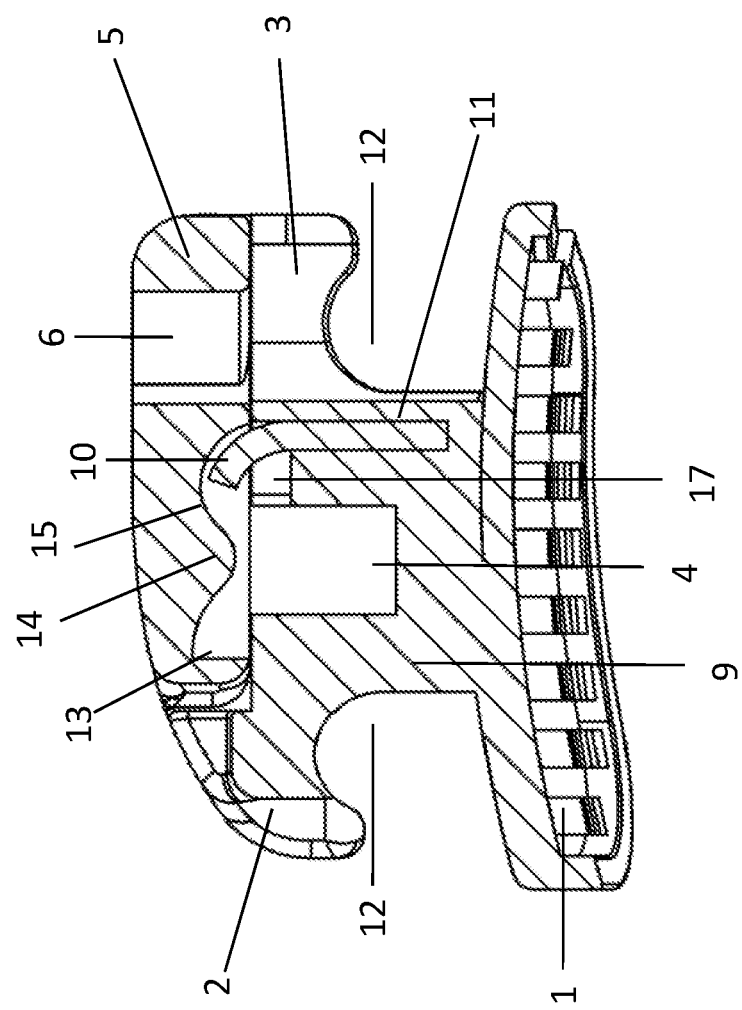
FIG. 7 shows an example transversal lateral cut view of the self-ligating bracket of FIG. 1 with the ligating sliding member in a closed position and the cantilever locking blade tab housed in a concave housing in the ligating sliding member, in accordance with aspects of the present invention.

As shown in FIG. 7, according to some aspects, the cantilever locking blade (10) may interact with the ligating sliding member (5), such that the cantilever locking blade (10) is housed in a concave housing (15) on the face of the ligating sliding member (5) that is proximal to the archwire slot when the self ligating member (5) is in the closed position. According to some aspects, the concave housing (15) may comprise a convex division portion (14) that substantially divides the concave housing (15).

Figure 8:
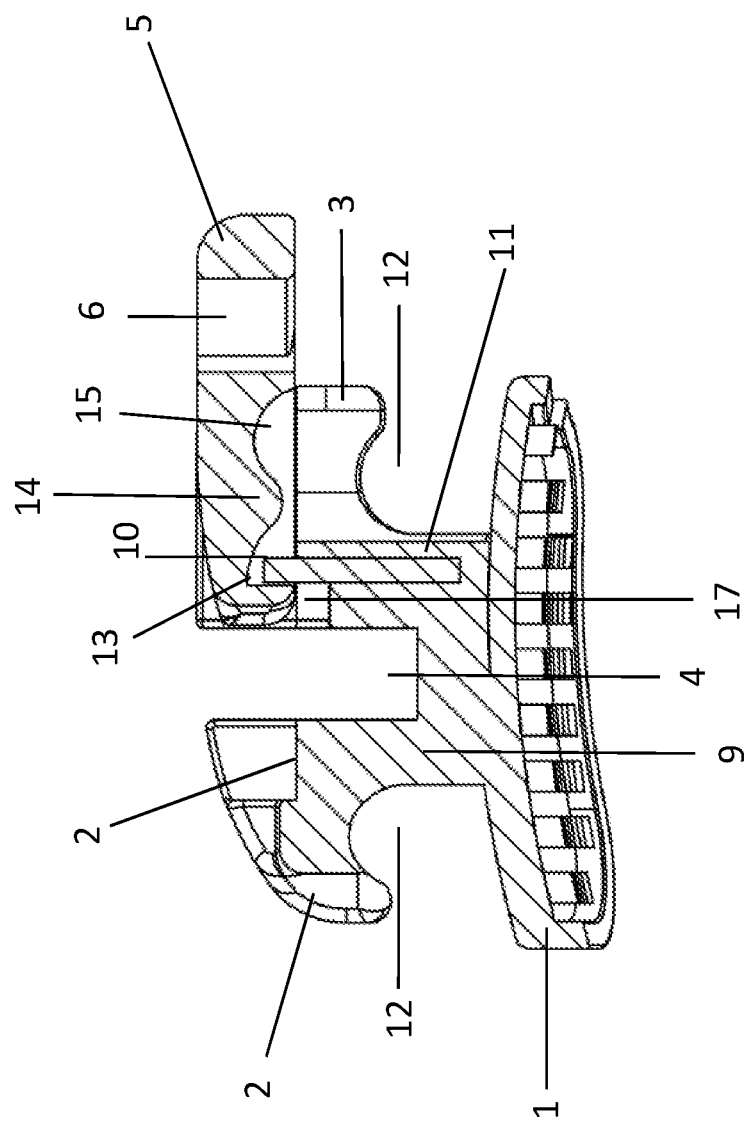
FIG. 8 shows an example transversal lateral cut view of the self-ligating bracket of FIG. 1 with the with the ligating sliding member in an open position with the cantilever locking blade tab facing an upright wall of the concave housing in the ligating sliding member in an open position, in accordance with aspects of the present invention.
Figure 9:
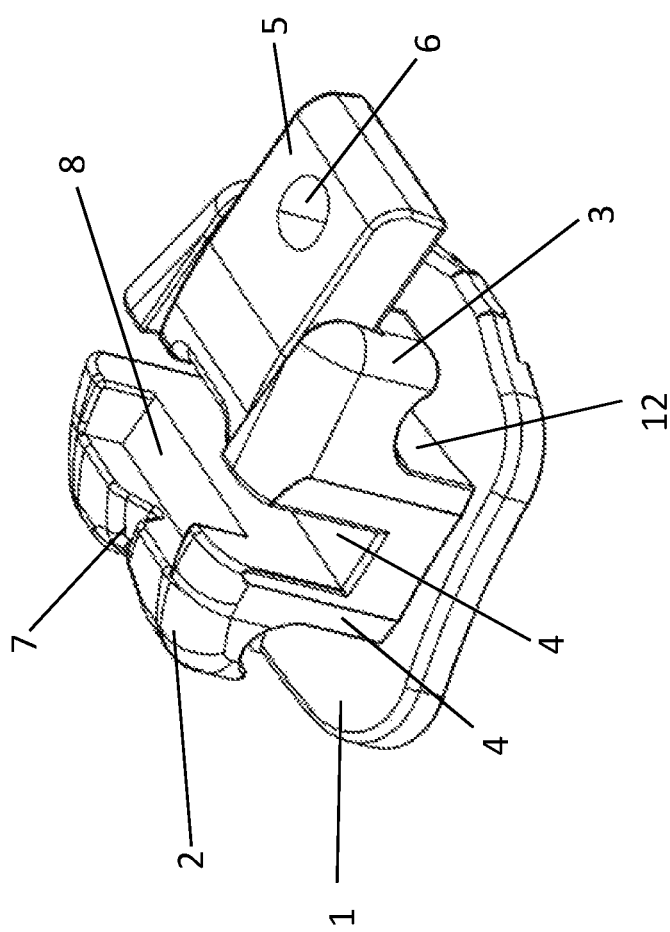
FIG. 9 shows an example perspective view of the self-ligating bracket of FIG. 1 with the ligating sliding member in an open position, in accordance with aspects of the present invention.
Figure 10:
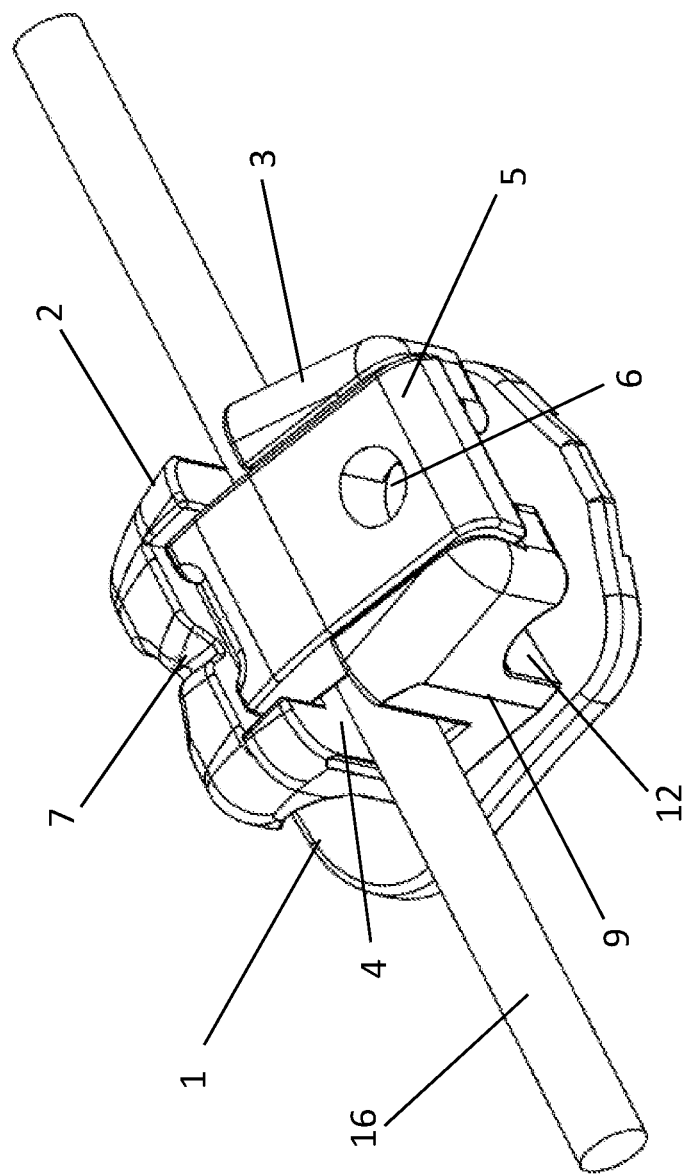
FIG. 10 shows an example perspective view of the self-ligating bracket of FIG. 1 with the ligating sliding member in a closed position retaining an archwire in the slot, in accordance with aspects of the present invention.
Figure 11:
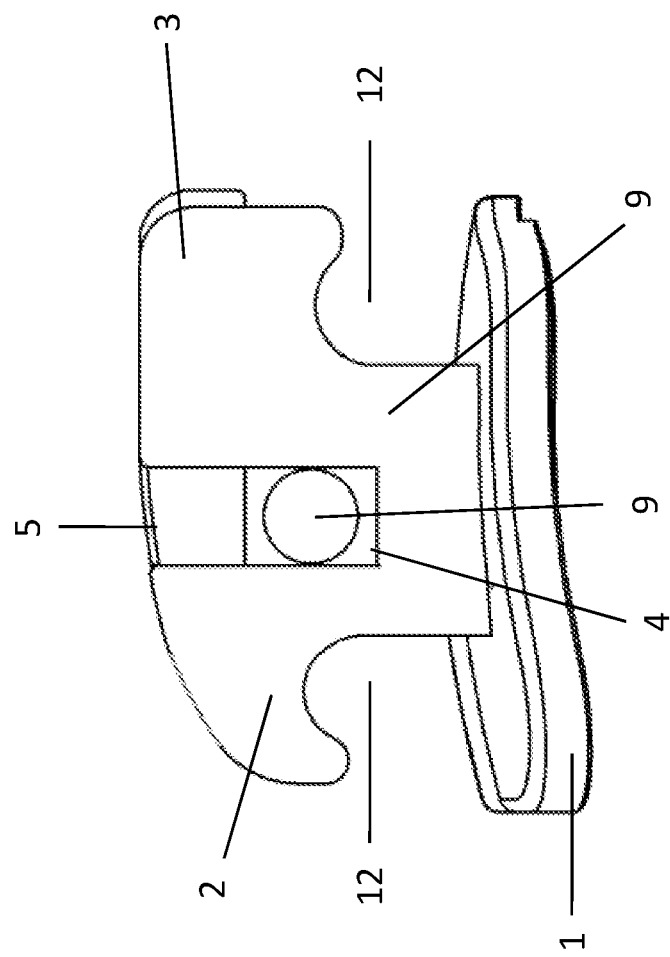
FIG. 11 shows an example lateral view of the self-ligating bracket of FIG. 1 with the ligating sliding member in a closed position retaining the archwire in the slot, in accordance with aspects of the present invention.
Figure 12:
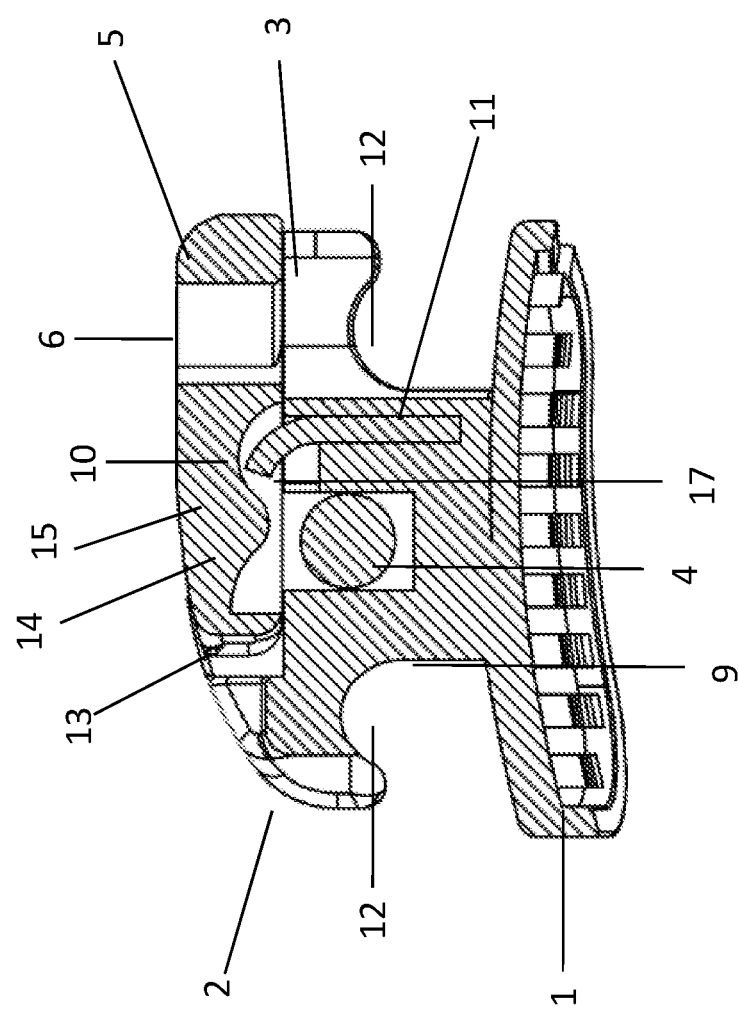
FIG. 12 shows an example transversal lateral cut view of the self-ligating bracket of FIG. 1 with the ligating sliding member in a closed position retaining the archwire in the slot, in accordance with aspects of the present invention.
Figure 13:
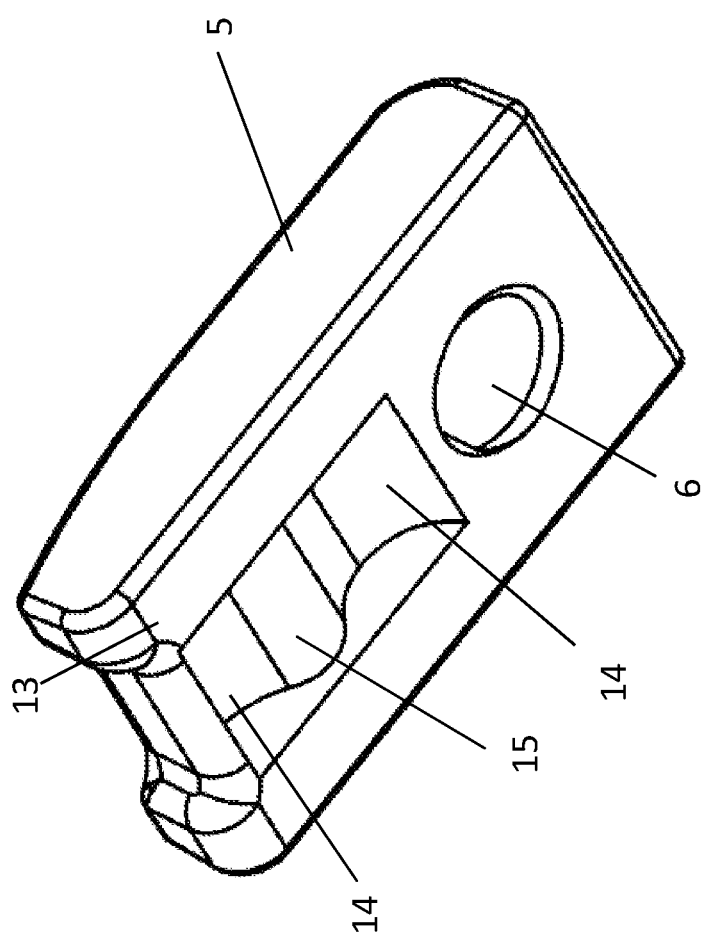
FIG. 13 shows a perspective view of the side of an example ligating sliding member with concave and convex surfaces, in accordance with aspects of the present invention.
Figure 14:
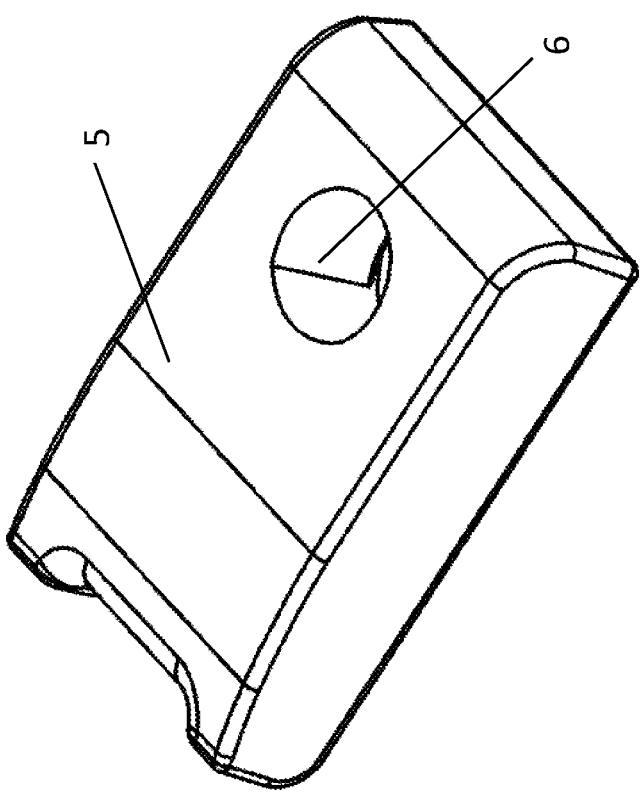
FIG. 14 shows a perspective view of the side of the ligating sliding member of FIG. 13 including a view of the through hole for inserting the opening instrument, in accordance with aspects of the present invention.

As shown in FIG. 8, according to some aspects, the concave housing (15) may also comprise a locking wall (13). According to some aspects, the locking wall (13) may be substantially 90° (e.g., +/−5%) and may interact with the cantilever locking blade (10) when the ligating sliding member (5) is in the open position. According to some aspects, the interaction between the cantilever locking blade (10) and the locking wall (13) may at least prevent the ligating sliding member from involuntarily or accidentally being removed from the body (9).

Figure 16B:
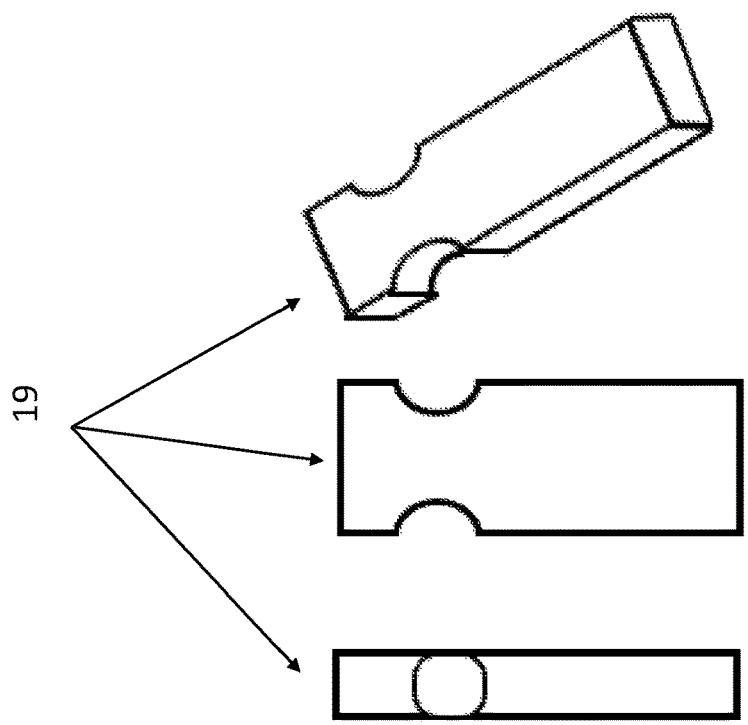
FIG. 16b shows an example cantilever locking blade with a substantially straight configuration with recesses therein, in accordance with aspects of the present invention.
Figure 16A:
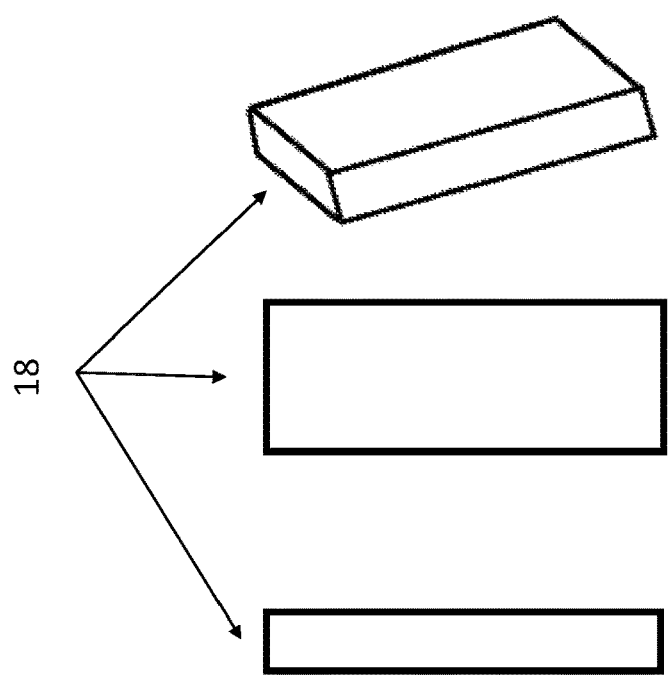
FIG. 16a shows an example cantilever locking blade with a substantially straight configuration without recesses therein, in accordance with aspects of the present invention.
Figure 17B:
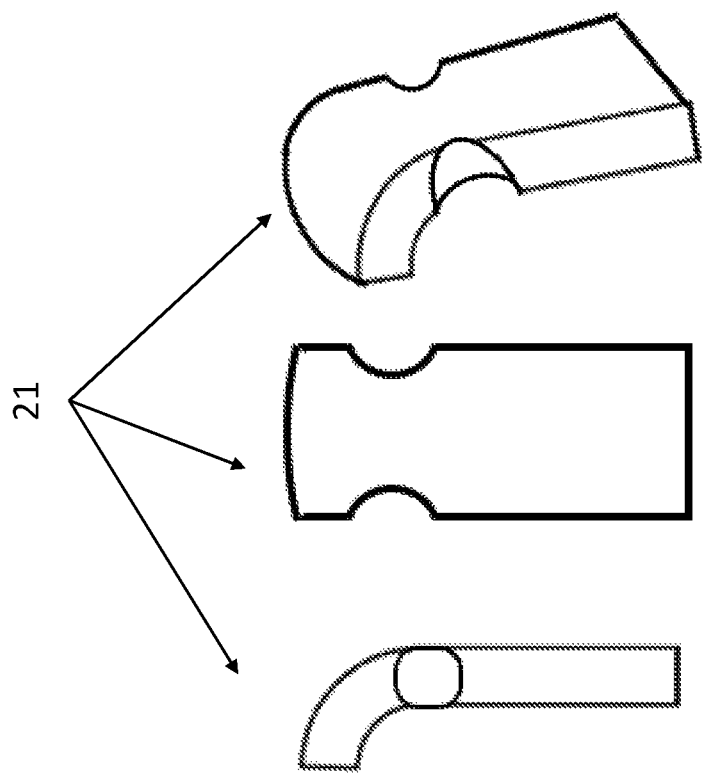
FIG. 17b shows an example cantilever locking blade with curved locking tabs with recesses therein, in accordance with aspects of the present invention.
Figure 17A:
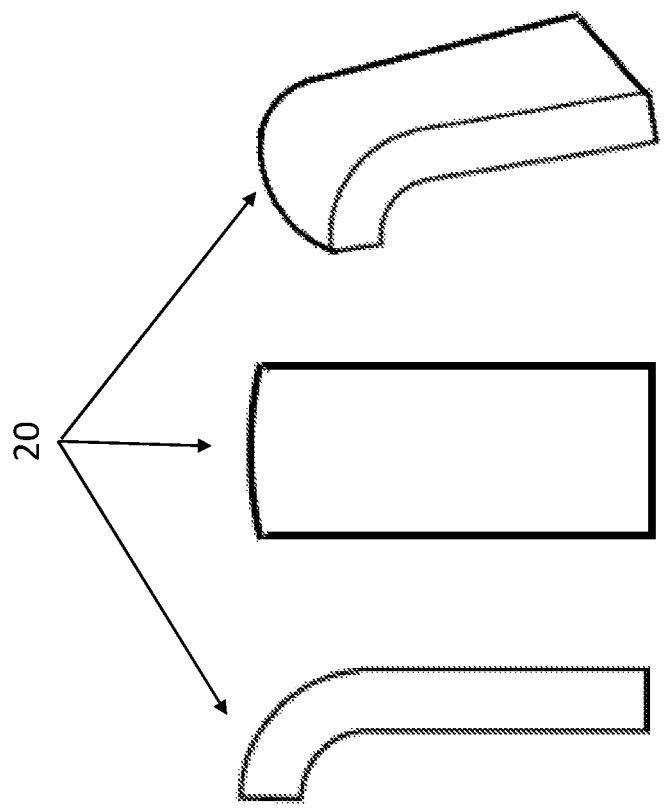
FIG. 17a shows an example cantilever locking blade with curved locking tabs without recesses therein, in accordance with aspects of the present invention.

As shown in FIGS. 16 and 17, aspects of the present invention may include several embodiments of the cantilever locking blade. For example, the cantilever locking blade may be a substantially straight blade (in its planar lengthwise direction) with recesses therein (19) or without recesses (18). According to some aspects, the cantilever locking blade may comprise a curved locking tab with recesses therein (21) or without recesses therein (20).

Figure 18:
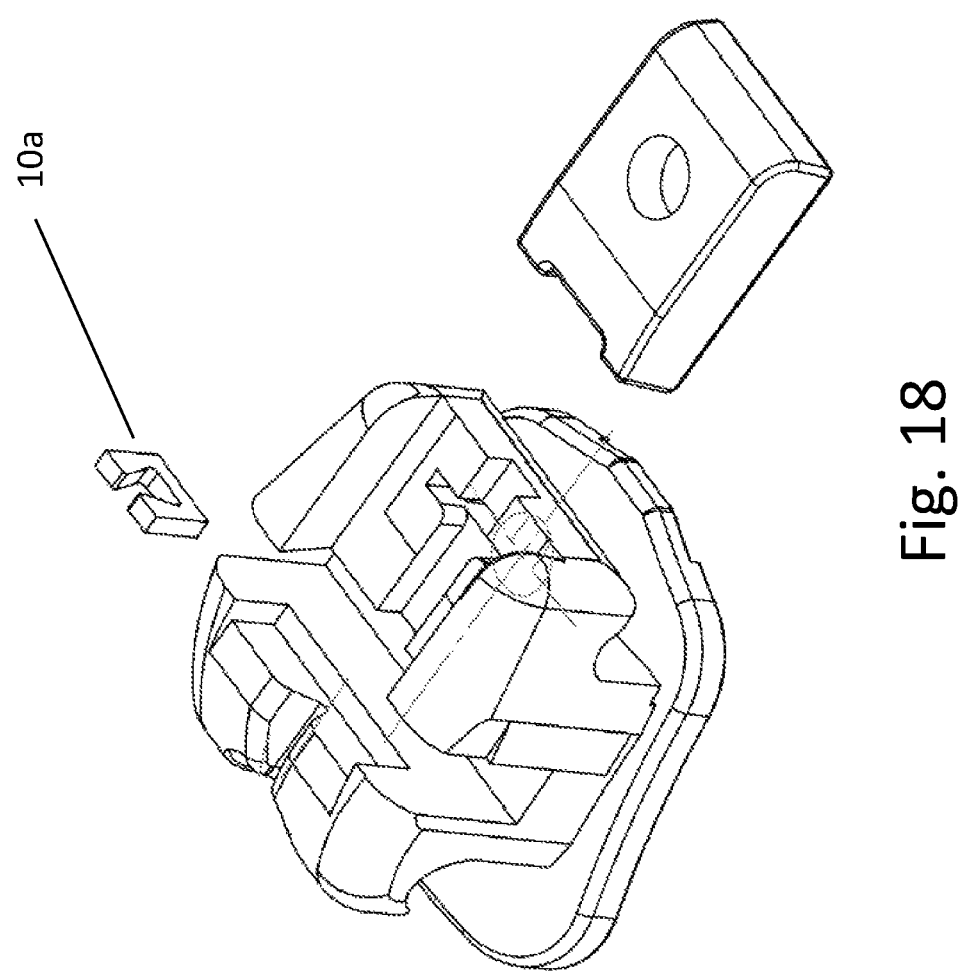
FIG. 18 shows an example perspective exploded view of the self-ligating bracket of FIG. 1 with an example cantilever locking blade with a flat "U" cross-sectional shape and the ligating sliding member, in accordance with aspects of the present invention.

As shown in FIG. 18, according to some aspects, a cantilever locking blade (10a) may be used that is configured in a generally "U" cross-sectional shape. According to some aspects, the "U" shaped cantilever locking blade may be configured to deflect force, for example, from the ligating sliding member. According to some aspects, the deflected force may at least partially force the arms of the "U" shaped cantilever locking blade laterally and in a direction parallel to the archwire slot, such as during assembly and/or use of the self-ligating bracket system.

Figure 29B:
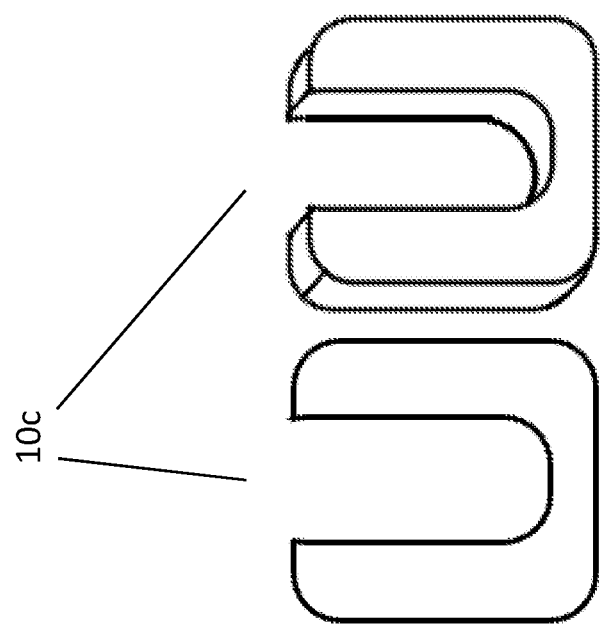
FIG. 29B shows example perspective and top views of a cantilever locking blade, in accordance with aspects of the present invention.
Figure 29C:
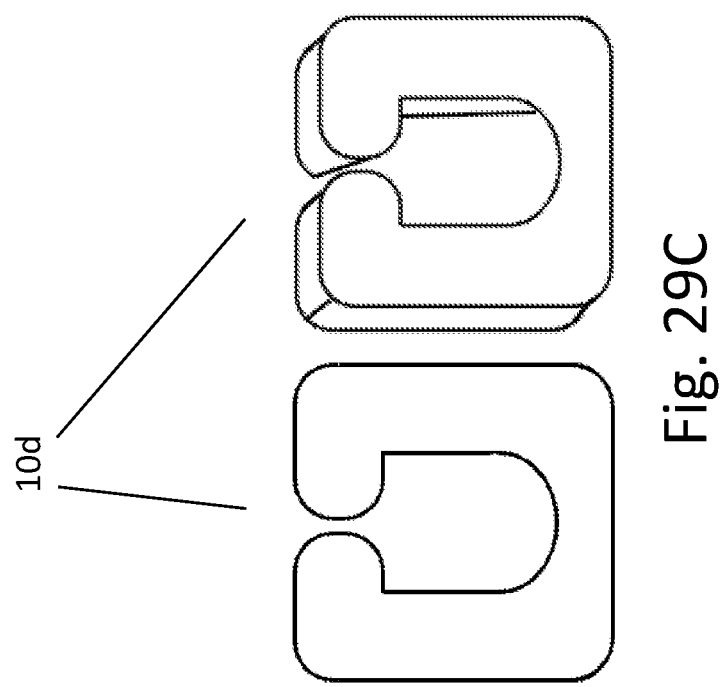
FIG. 29C shows example perspective and top views of a cantilever locking blade, in accordance with aspects of the present invention.

As shown in FIGS. 29A-C, the "U" shaped cantilever locking blade may comprise a variety of shapes. For example, the "U" shaped cantilever locking blade may be shaped with substantially sharp corners (10b) and/or may be shaped with substantially rounded corners (10c). According to some aspects, each arm of the "U" shaped cantilever locking blade may comprise an inwardly extending locking tab (10d). According to some aspects, the inwardly extending locking tab may at least partially provide the "U" shaped cantilever locking blade with the ability to deflect as a force, for example, from the ligating sliding member, is applied. For example, the arms may flex laterally in opposite directions and parallel to the archwire slot, while concomitantly, the locking tabs may be pushed towards the archwire slot and perpendicular to the deflection of the arms, when the "U" shaped locking blade is inserted into the self-ligating bracket system.

Figure 24:
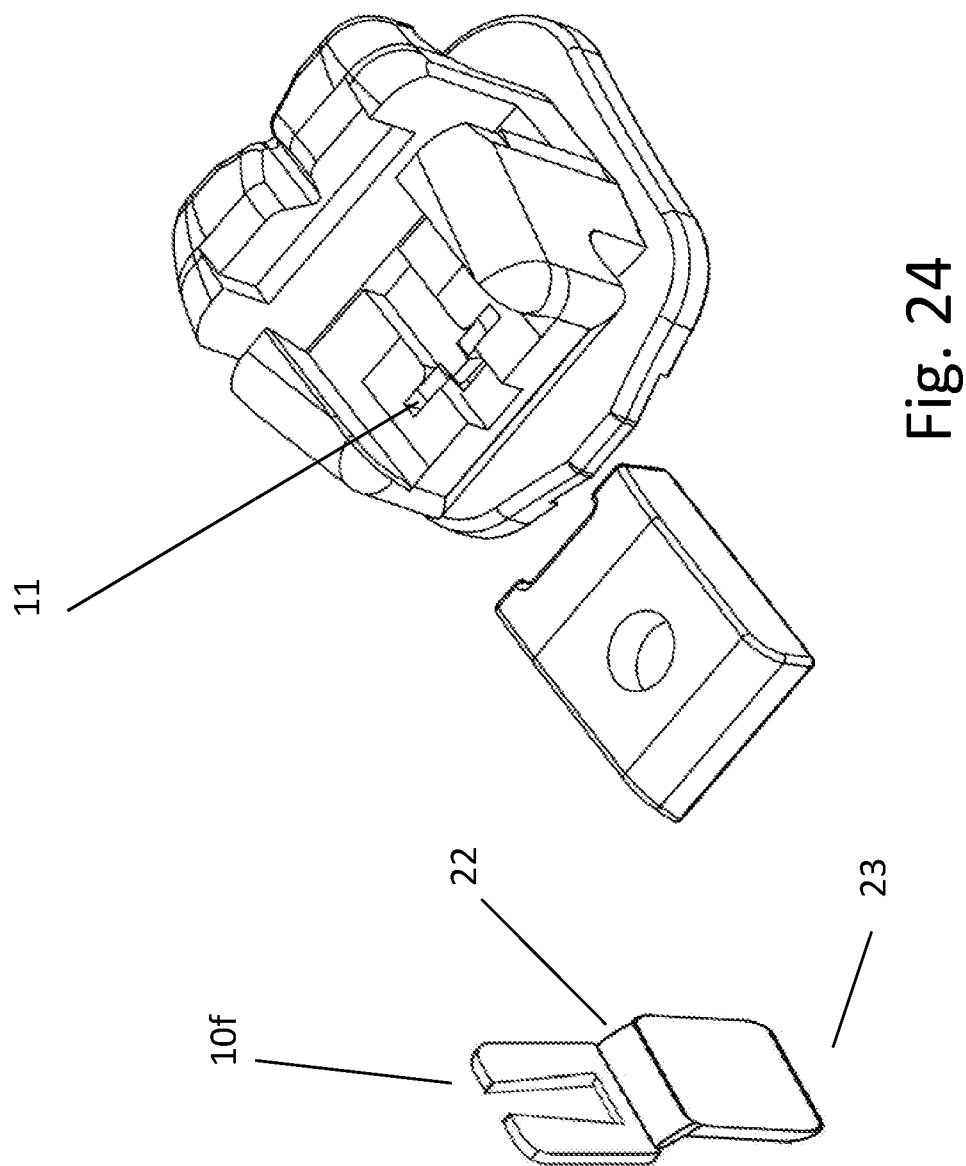
FIG. 24 shows an exploded view of the ligating sliding member of FIG. 23 with the cantilever locking blade comprising a radius joining vertical arms of the "U" shape to a flat segment, and the ligating sliding member, in accordance with aspects of the present invention.

As shown in FIG. 24, the "U" shaped cantilever locking blade (10f) may comprise a radius section (22) that may join the vertical arms of the "U" shape to a flat segment (23). According to some aspects, the flat segment (23) may be configured to be received in a housing (11). According to some aspects, the housing (11) may be configured according to the description herein. According to some aspects, the radius (22) and the flat segment (23) may at least partially allow the cantilever locking blade (10f) to be flexible in all or a wide range of directions.

Figure 30C:
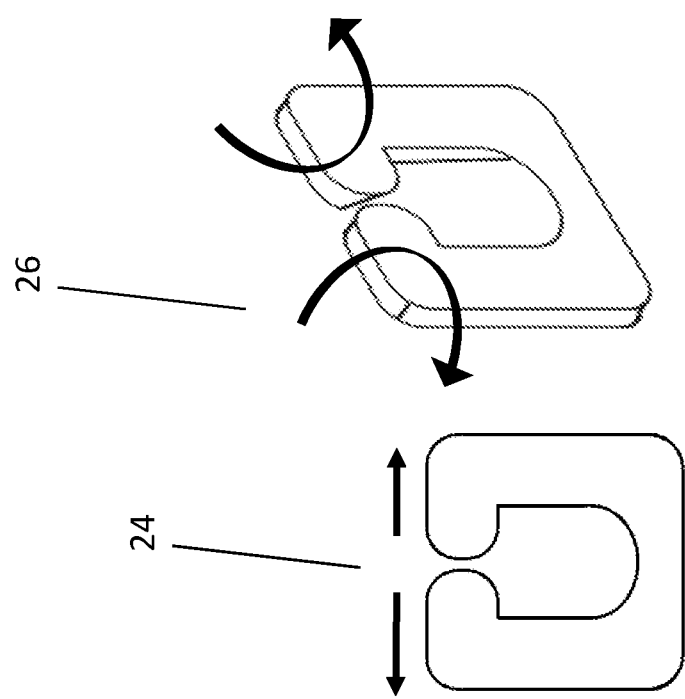
FIG. 30C shows example perspective and top views of a cantilever locking blade and its direction of movement, in accordance with aspects of the present invention.
Figure 31:
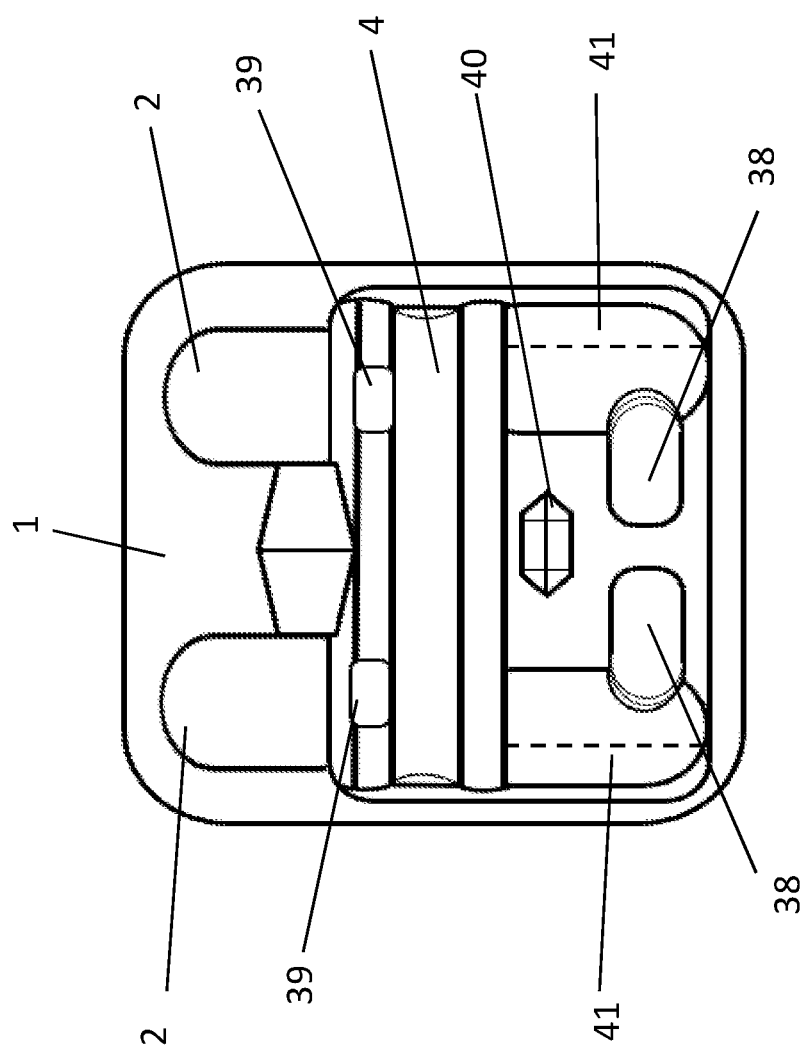
FIG. 31 shows an example top view of a self-ligating bracket with a flexible locking bridge, in accordance with aspects of the present invention.
Figure 32:
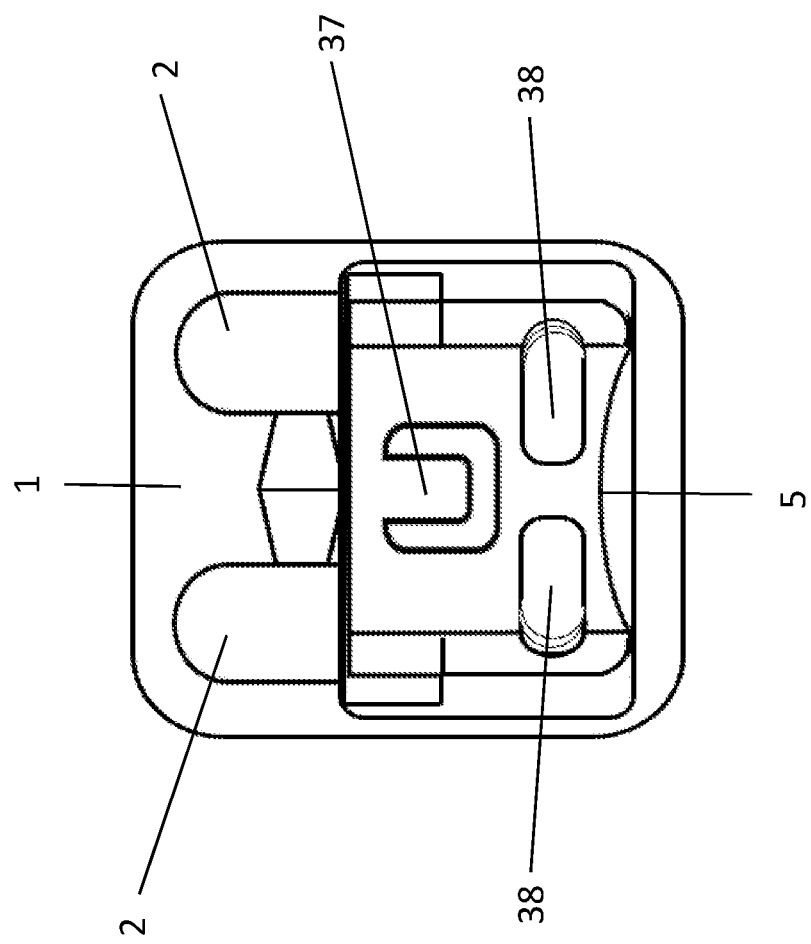
FIG. 32 shows an example top view of a self-ligating bracket with a flexible locking bridge and a ligating sliding member in the closed position, in accordance with aspects of the present invention.

As shown in FIGS. 30A-C, the cantilever locking blade may be flexible in several and/or all or most planes of spaces. According to some aspects, the arms of the cantilever locking blade may be configured to flex laterally in opposite directions, and parallel to the archwire slot (24). According to some aspects, the cantilever locking blade may be configured to move perpendicular to the archwire slot (25) during assembly. According to some aspects, locking tabs on the arms of the cantilever locking blade may be configured to flex perpendicular to the deflection of the arms, thereby allowing the cantilever locking blade to move in a generally rotational fashion (26) during assembly. According to some aspects, the cantilever locking blade may be flexible in all or numerous planes of space (27).

Figure 23:
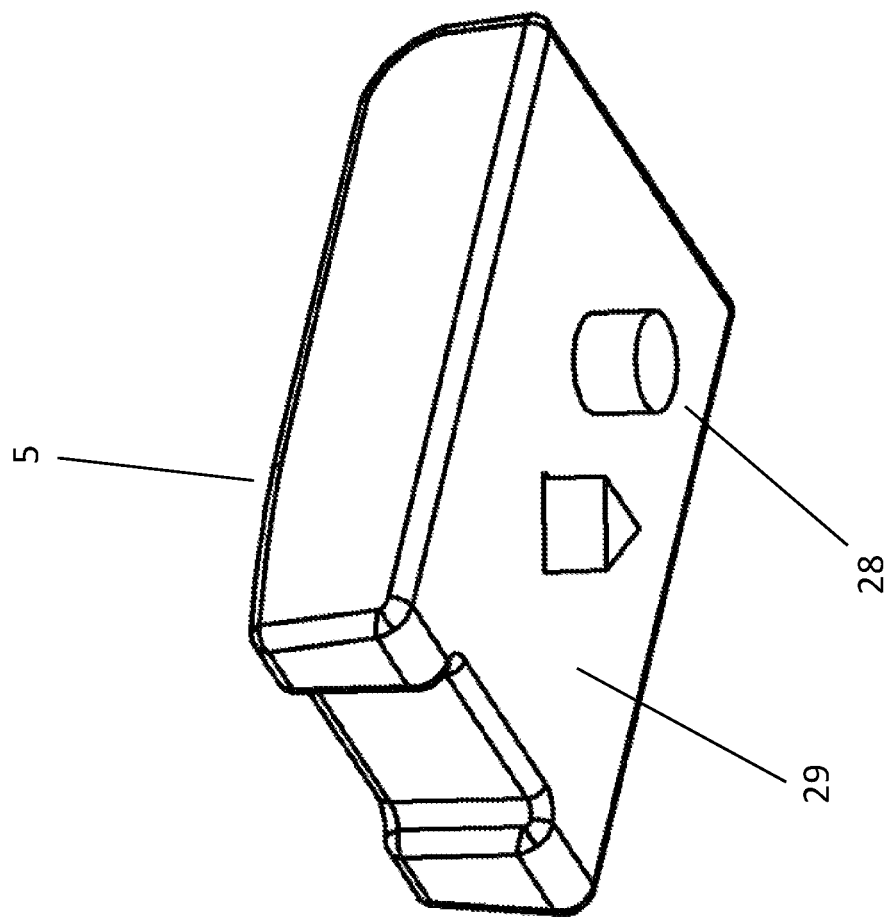
FIG. 23 shows a perspective view of an example ligating sliding member with protuberances, in accordance with aspects of the present invention.

As shown in FIG. 23, the ligating sliding member (5) may comprise one or more protuberances (28). According to some aspects, each of the protuberances may be rounded or have a polygonal cross-sectional shape in the extending direction from a surface (29) of the sliding member (5). According to some aspects, the one or protuberances may each have the same shape or differing shapes. According to some embodiments, the ligating sliding member (5) may comprise one round protuberance and one triangular protuberance.

According to some aspects, the protuberances may be located on the face of ligating sliding member (5) that is proximal to the archwire slot when assembled within the self-ligating bracket system. According to some aspects, the face of the ligating sliding member (5) that is proximal to the archwire slot may have a generally flat surface (29).

Figure 25A:
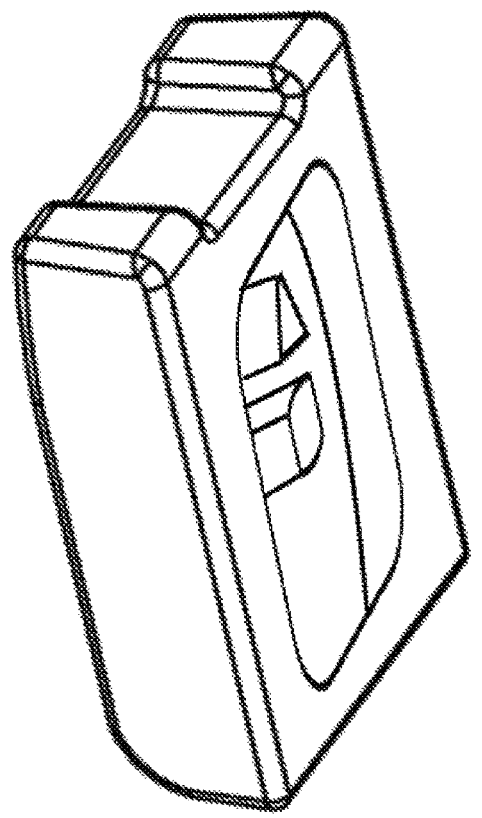
FIG. 25a shows a perspective view of the ligating sliding member of FIG. 23 with protuberances located in a housing in the ligating sliding member comprising a frontal opening, in accordance with aspects of the present invention.
Figure 25B:
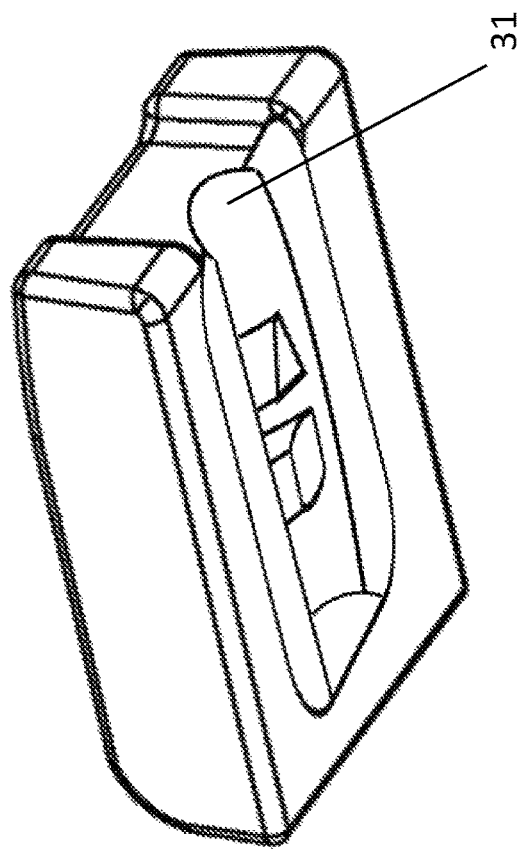
FIG. 25b shows a perspective view of the ligating sliding member of FIG. 23 with protuberances located in a housing in the ligating sliding member, in accordance with aspects of the present invention.
Figure 26:
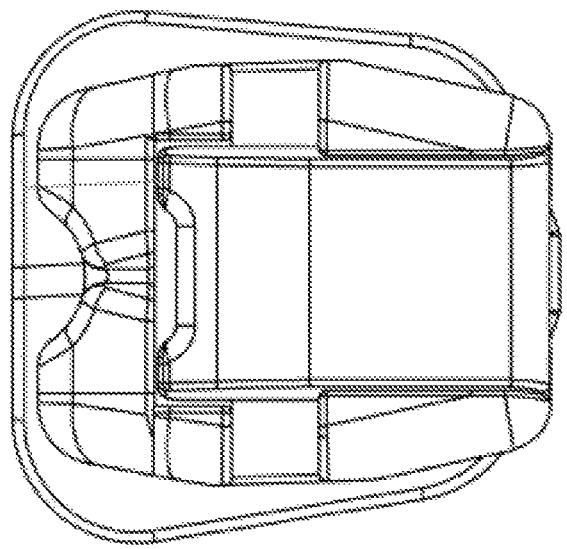
FIG. 26 shows an example top view of the self-ligating bracket of FIG. 1, in accordance with aspects of the present invention.
Figure 27:
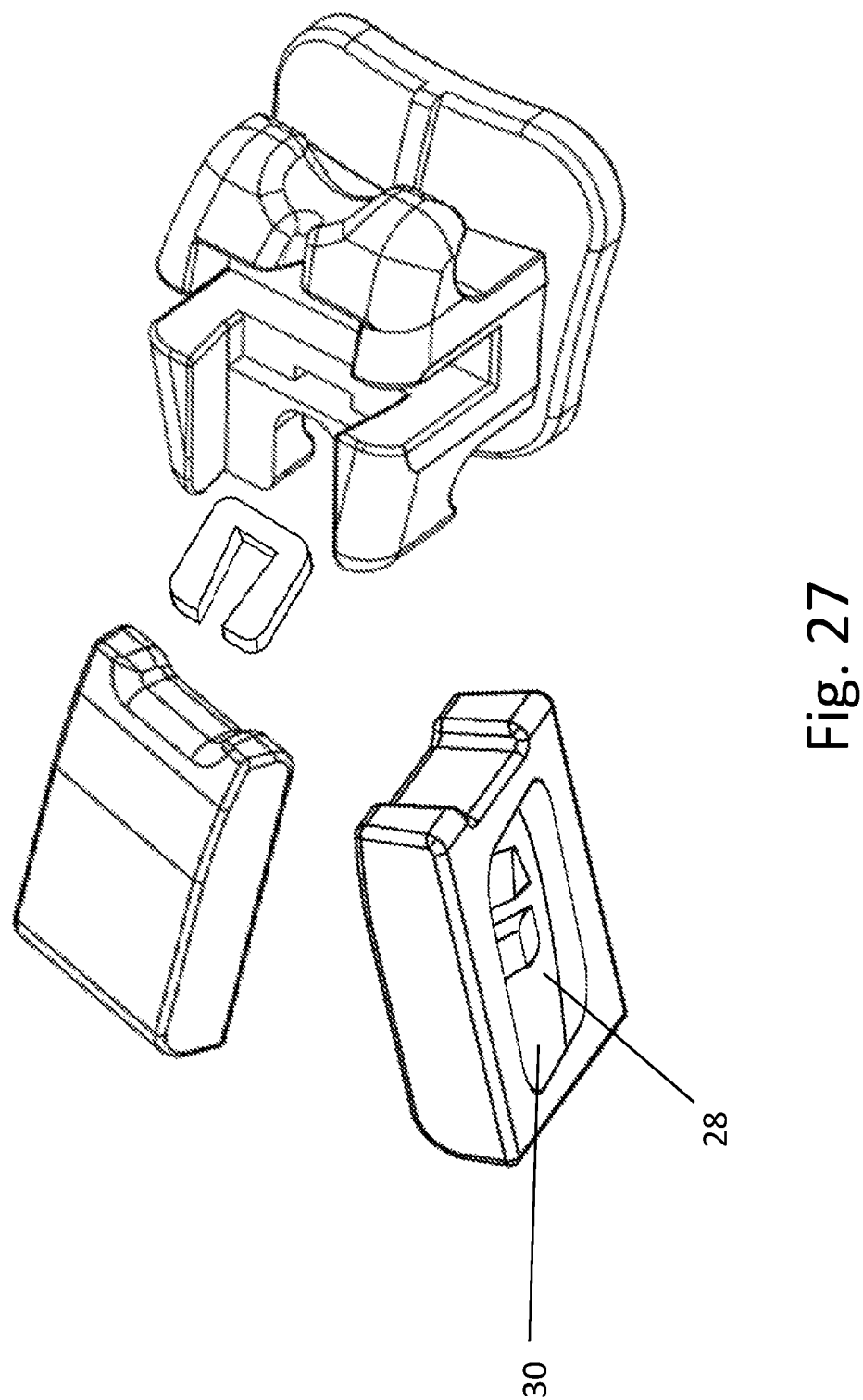
FIG. 27 shows an example exploded view of the self-ligating bracket of FIG. 1 with the cantilever locking blade in a "U" shape and two view of the ligating sliding member, in accordance with aspects of the present invention.
Figure 28:
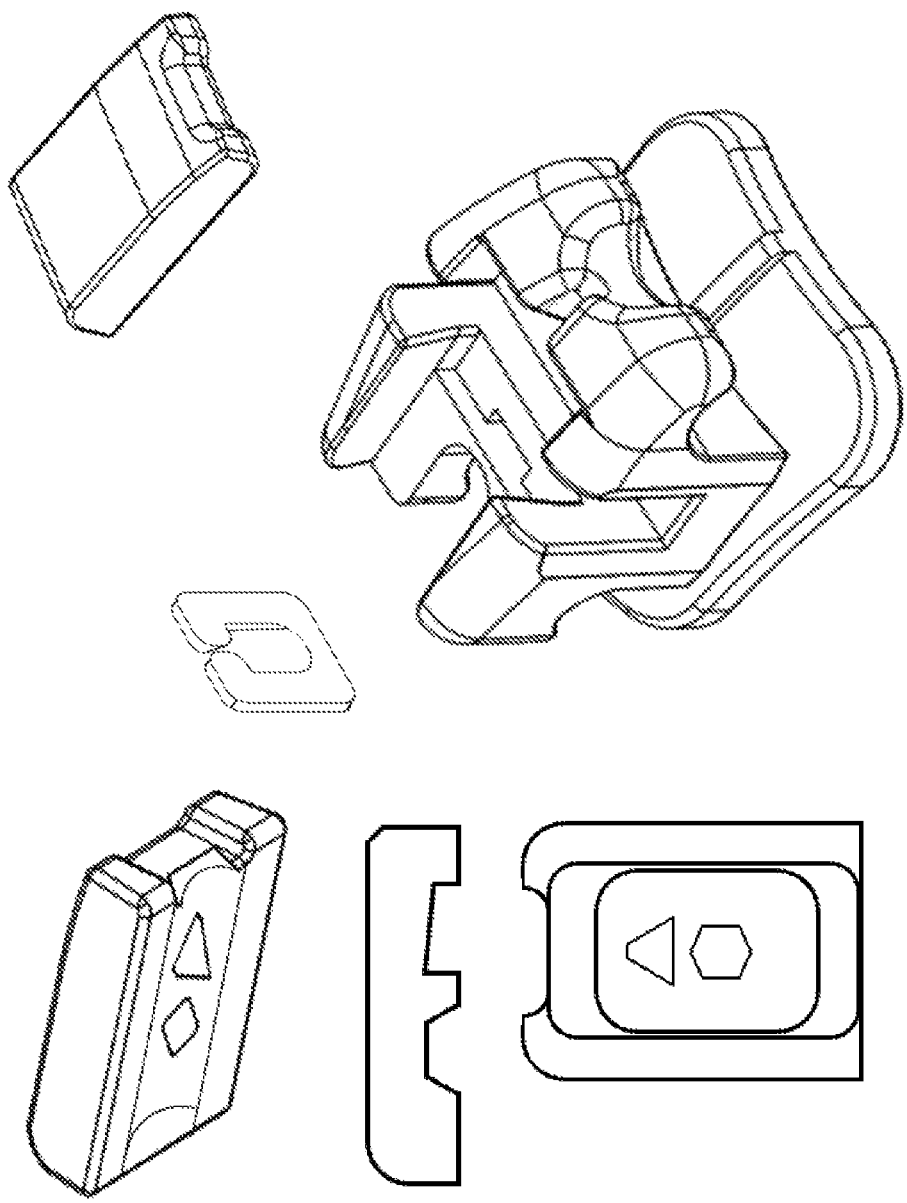
FIG. 28 shows an example exploded view of the self-ligating bracket of FIG. 1 with the cantilever locking blade in a "U" shape and with flexible locking tabs, and four views of the ligating sliding member, in accordance with aspects of the present invention.

As shown in FIG. 27, according to some aspects, the protuberances (28) may be located in a recess (30) of the ligating sliding member. As shown in FIG. 25, according to some example aspects, the recess may comprise a frontal opening (31). According to some aspects, the frontal opening (31) may allow the ligating sliding member (5) and the body of the bracket to be assembled without the ligating sliding member (5) deflecting the cantilever locking blade towards the archwire slot.

According to some aspects, the one or more protuberances may be configured to interact with the cantilever locking blade. According to some aspects, interaction between the cantilever locking blade and the one or more protuberances may at least partially prevent the ligating sliding member from involuntarily or accidentally being removed from the body, and/or involuntarily or accidentally being moved between open and closed positions.

FIG. 36a-FIG. 36c show the face of an example ligating sliding member (5) that is configured to be proximal to an archwire slot. According to some aspects, the ligating sliding member (5) may comprise protuberances (36). According to some aspects, the protuberances (36) may be round in cross-section, have three dimensional polygonal shape, and/or a combination thereof. According to some aspects, the protuberances (36) may extend toward a centerline of the ligating sliding member (5) (e.g., inwardly within the interior of ligating sliding member (5)).

FIG. 36a-FIG. 36c show an example the progression of the ligating sliding member (5) from a closed position (FIG. 36a) to an open position (FIG. 36c). According to some aspects, the flexible locking arms (45) of the cantilever locking blade may be configured to deflect towards a centerline of the ligating sliding member (5), such as via protuberances (36), as the ligating sliding member (5) transverses the cantilever locking blade, and then return to their original positions, as the ligating sliding member (5) slides between open and closed positions. For example, the flexible locking arms (45) may return to their original position when the ligating sliding member (5) is between closed and open positions (see, for example, FIG. 36b) and/or when the ligating sliding member (5) is in the open position (see, for example, FIG. 36c). As seen, for example, in FIG. 36c, when the ligating sliding member is in the open position, the flexible locking arms (45) may be positioned between a protuberance (36) and a locking wall (13). In this manner, the ligating sliding member (5) may be locked such that it is retained within the body of the bracket. Similarly, when the ligating member (5) is in the closed position, the protuberances (36) may prevent the ligating sliding member (5) from inadvertently moving to the open position, and/or such position may "lock" the ligating sliding member (5) in the closed position.

Figure 37:
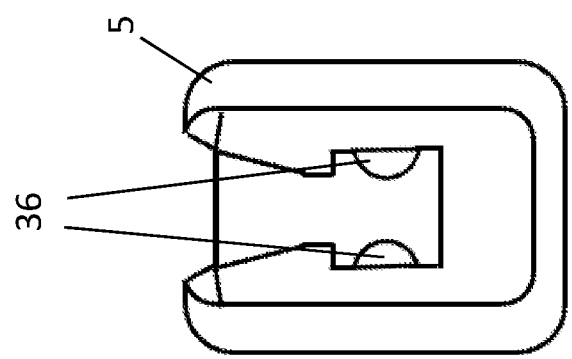
FIG. 37 shows an alternative example bottom view of a ligating sliding member with protuberances located in a recess, in accordance with aspects of the present invention.

According to some aspects, the recess and/or protuberances of the ligating sliding member may comprise several variations of geometry. For example, FIG. 37 shows an example of an alternative geometry of the ligating sliding member (5). According to some aspects, the ligating sliding member (5) and the protuberances (36) thereon may function substantially similarly to the corresponding features of the ligating sliding member (5) described in FIG. 36.

According to some aspects, as shown in FIGS. 31-34, the bracket body (9) may comprise a flexible locking bridge (38) as an integral part or section thereof. The flexible locking bridge (38) may be flexible, such that the bridge (38) may be displaced by an inserted ligating sliding member (5), for example, by a locking wedge protuberance (37) located upon a portion of the sliding member (5). According to some aspects, the flexible locking bridge (38) may flex upwardly when the ligating sliding member (5) slides between open and closed positions. According to some aspects, the flexible locking bridge (38) may be configured to return to (or be biased toward) its original geometry once the ligating sliding member (5) is in the open or closed position. For example, the flexible locking bridge (38) may be configured to return to (or tend toward) its original geometry once the ligating sliding member (5) is in the closed position in order to at least partially hold the ligating sliding member (5) in place.

According to some aspects, the bracket of this example embodiment may comprise a plastic, filled plastic, composite, and/or polymer. According to some aspects, the bracket of this example embodiment may comprise a metal and be configured such that the flexible locking bridge (38) may be plastically deformed by the ligating sliding member and capable of returning to its original geometry, as discussed above.

As shown in FIG. 33, the ligating sliding member (5) may also comprise a pair of rail guards (41) that may be configured to interact with the lower tie wings (3) such that the ligating sliding member (5) moves straightly between the lower tie wings (3) in the (X) direction between open and closed positions.

Figure 35D:
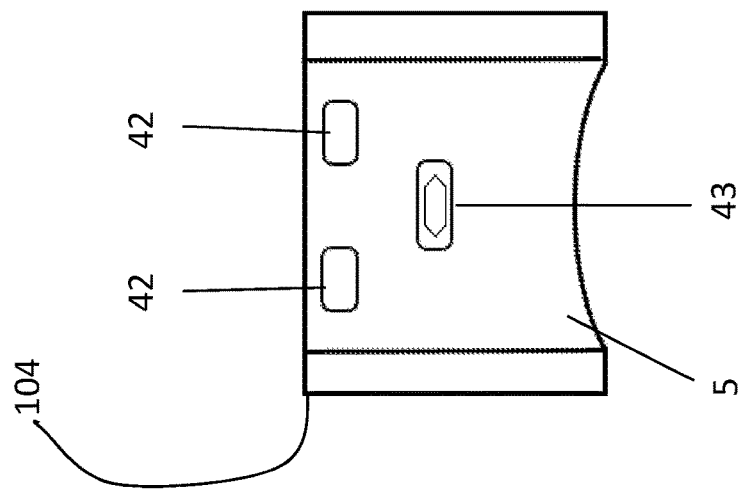
FIG. 35d shows an example bottom view of a ligating sliding member with upper and lower wedge locking recesses, in accordance with aspects of the present invention.
Figure 35C:
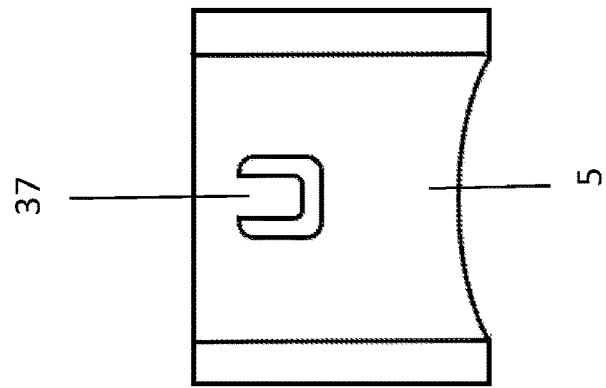
FIG. 35c shows an example top view of a ligating sliding member with a locking wedge protuberance, in accordance with aspects of the present invention.
Figure 35A:
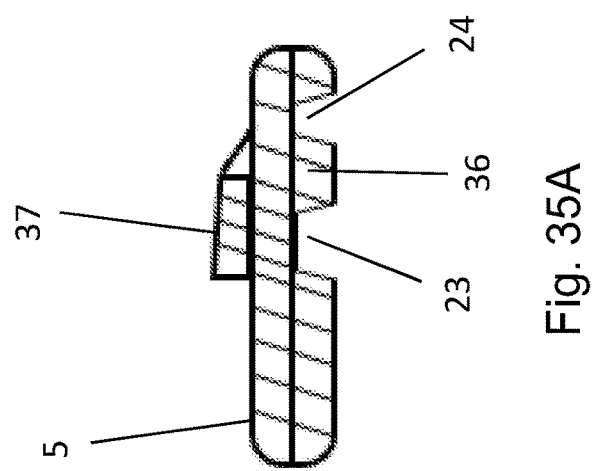
FIG. 35a shows an example transversal lateral cut view of a ligating sliding member with a locking wedge protuberance, in accordance with aspects of the present invention.
Figure 35B:
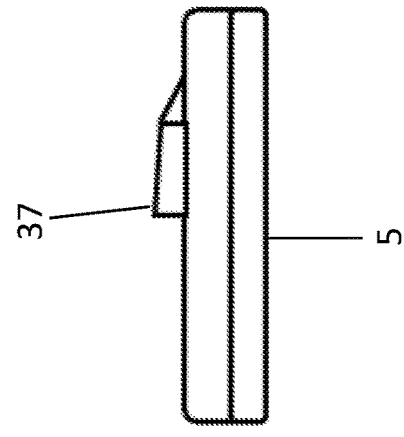
FIG. 35b shows an example lateral view of a ligating sliding member with a locking wedge protuberance, in accordance with aspects of the present invention.

As shown in FIG. 33, the bracket body (9) may also comprise one or more upper wedge locking ramps (39) and/or one or more lower wedge locking ramps (40), wherein the one or more upper wedge locking ramps (39) and one or more lower wedge locking ramps (40) may be separated by the archwire slot (4). The one or more upper wedge locking ramps (39) and/or one or more lower wedge locking ramps (40) may be configured to interact with the ligating sliding member (5). For example, as shown in FIG. 35d, the underside (104) of ligating sliding member (5) may comprise one or more upper wedge locking ramp recesses (42) and/or one or more lower wedge locking ramp recesses (43) corresponding to the one or more upper wedge locking ramps (39) and one or more lower wedge locking ramps (40) and be configured to interact therewith in order to secure the ligating sliding member (5) in a closed position.

Figure 39:
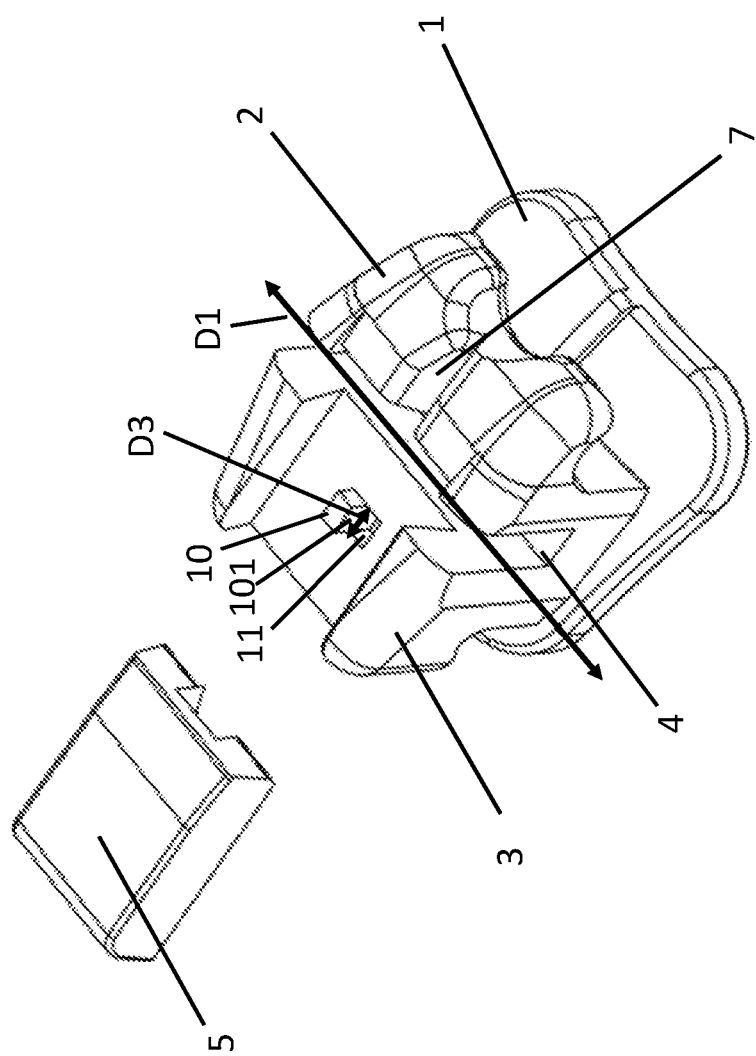
FIG. 39 shows an example of an exploded perspective top view of a self-ligating bracket with a cantilever locking blade and a ligating sliding member, in accordance with aspects of the present invention.

As shown in FIG. 39, the cantilever locking blade (10) may be housed in a housing (11) that allows the cantilever locking blade (10) to move in the mesial and/or distal direction (i.e., parallel to the lengthwise direction of the archwire slot (4), such as in direction [D1]). The housing (11) may be configured such that the face (101) of the cantilever locking blade (10) is extends in directions perpendicular to the direction of the length of the archwire slot (4). For example, the housing may comprise a transversal recess wherein the cantilever locking blade (10) may be biased (e.g., via a spring or lever) to a certain position, but for which the blade 10 may be free to move in the mesial and distal direction, for example, as the ligating sliding member (5) moves between the closed and open positions, as will be explained in more detail below.

Figure 19:
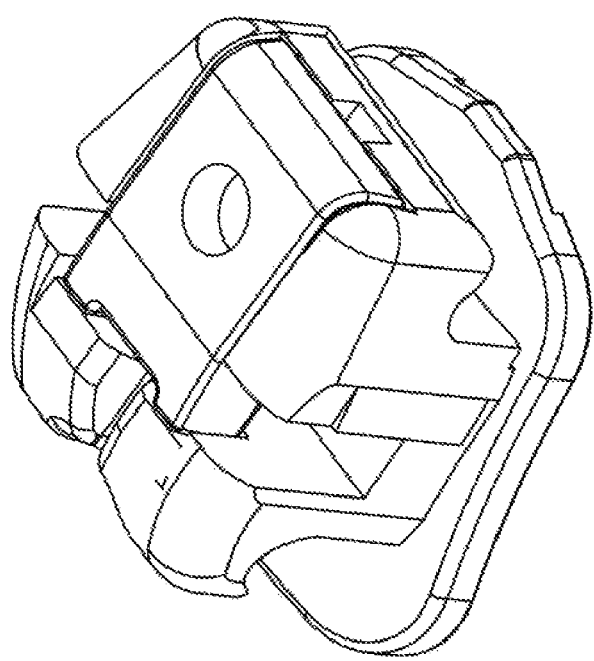
FIG. 19 shows an example perspective view of the self-ligating bracket of FIG. 1 in a closed position, in accordance with aspects of the present invention.
Figure 20:
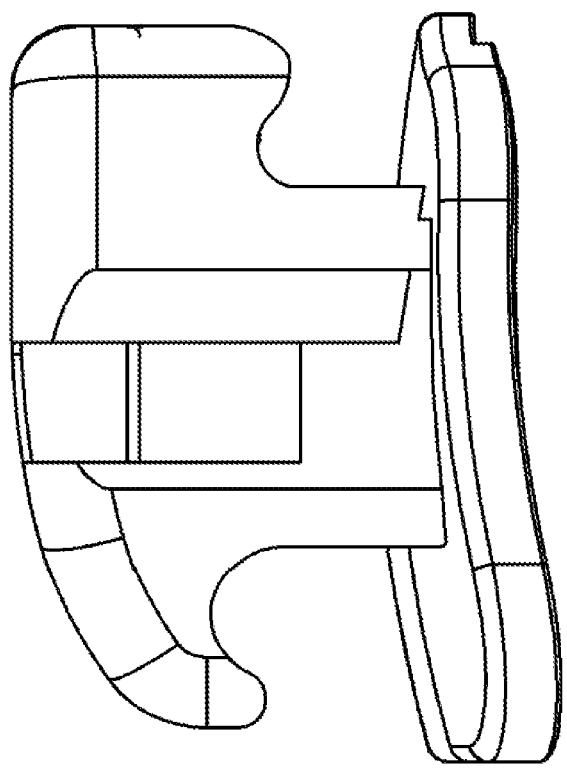
FIG. 20 shows an example lateral view of the self-ligating bracket of FIG. 1 in a closed position, in accordance with aspects of the present invention.
Figure 21:
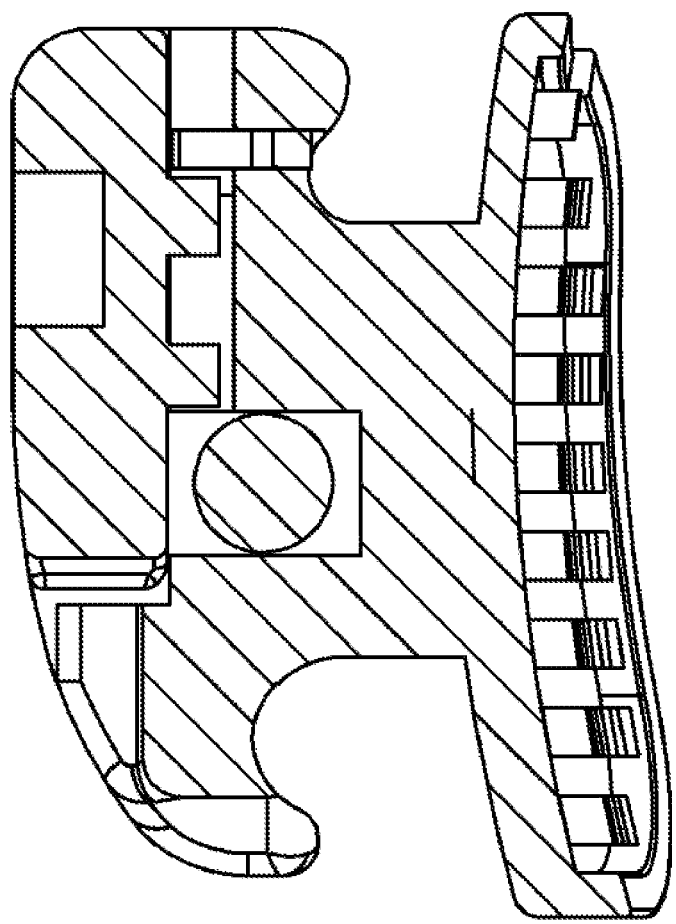
FIG. 21 shows an example transversal lateral cut view of the self-ligating bracket of FIG. 1 in a closed position with protuberances on a face of the ligating sliding member which is adjacent to the archwire slot, in accordance with aspects of the present invention.
Figure 22:
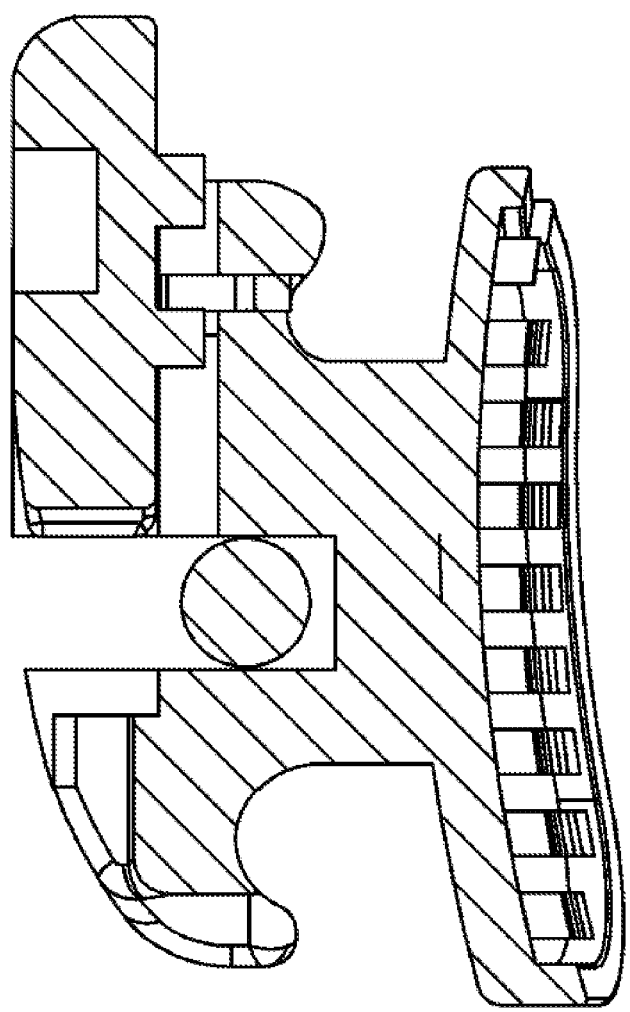
FIG. 22 shows an example transversal lateral cut view of the self-ligating bracket of FIG. 1 in an open position with protuberances on a face of the ligating sliding member which is adjacent to the archwire slot, in accordance with aspects of the present invention.
Figure 40:
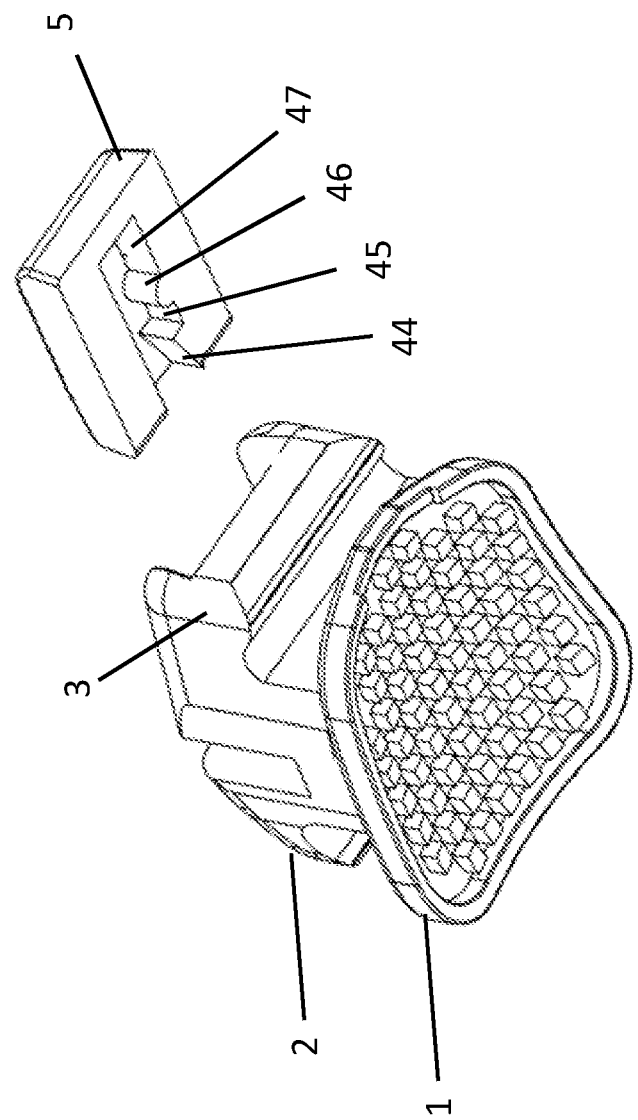
FIG. 40 shows an example of an exploded perspective bottom view of a self-ligating bracket with a cantilever locking blade and a ligating sliding member, in accordance with aspects of the present invention.
Figure 41:
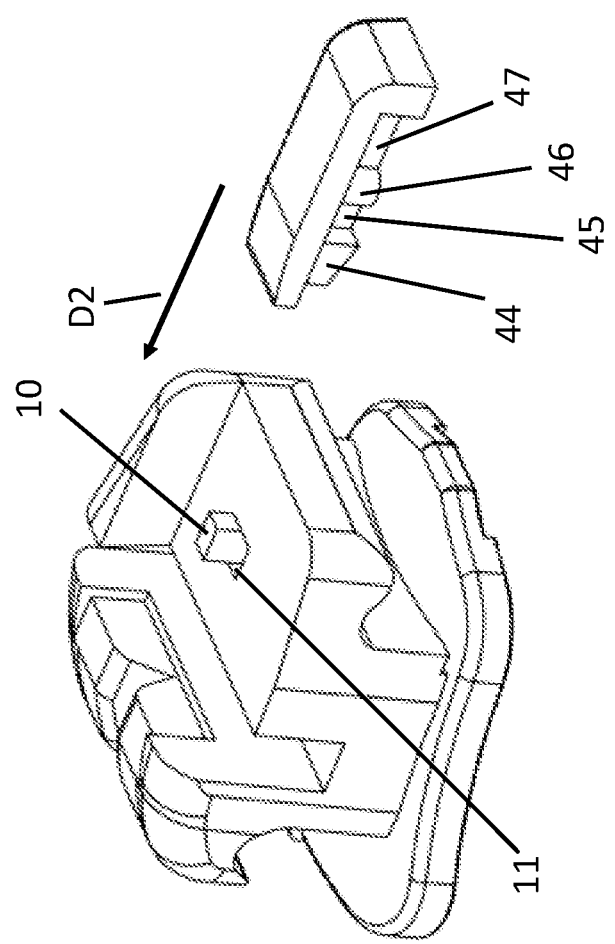
FIG. 41 shows an example of an exploded perspective view of a self-ligating bracket with a cantilever locking blade, with a transversal sectional view of the ligating sliding member, in accordance with aspects of the present invention.

For example, as shown in FIGS. 40 and 41, the ligating sliding member (5) may comprise structural features on the face that is proximal to the cantilever locking blade (10) when in an assembled position (e.g., similar to as shown in FIG. 19), the structural features being configured to interoperate with the cantilever locking blade (10). For example, the sliding ligating member (5) may comprise an angular wall (44) and a locking protuberance (46) that may interoperate with the cantilever locking blade (10) as the ligating sliding member (5) moves between the closed and open positions. For example, as the ligating sliding member (5) is moved past the cantilever locking blade (10) (e.g., in direction [D2] as shown in FIG. 41), the angular wall (44) and/or the locking protuberance (46) may cause the cantilever locking blade (10) to move in the mesial or distal direction as the cantilever locking blade (10) contacts them. That is, the cantilever locking blade (10) may be biased to a first biased position, but may move to a second position due to the force of the angular wall (44) and the locking protuberance (46) passing thereby.

As shown in FIGS. 40 and 41, the ligating sliding member (5) may comprise, for example, two indents (47, 45) on either side of the locking protuberance (46). For example, the ligating sliding member (5) may comprise a closed position indent (47) and an open position indent (45) that correspond to a closed position and an open position of the ligating sliding member (5), respectively. According to some aspects, the closed position indent (47) and the open position indent (45) may be configured to house the cantilever locking blade (10) in a first biased position, such that when the angular wall (44) and/or the locking protuberance (46) moves past the cantilever locking blade (10), the cantilever locking blade (10) returns to the first biased position and is locked in either the closed position indent (47) or the open position indent (45) until a user moves the ligating sliding member (5).

Figure 42:
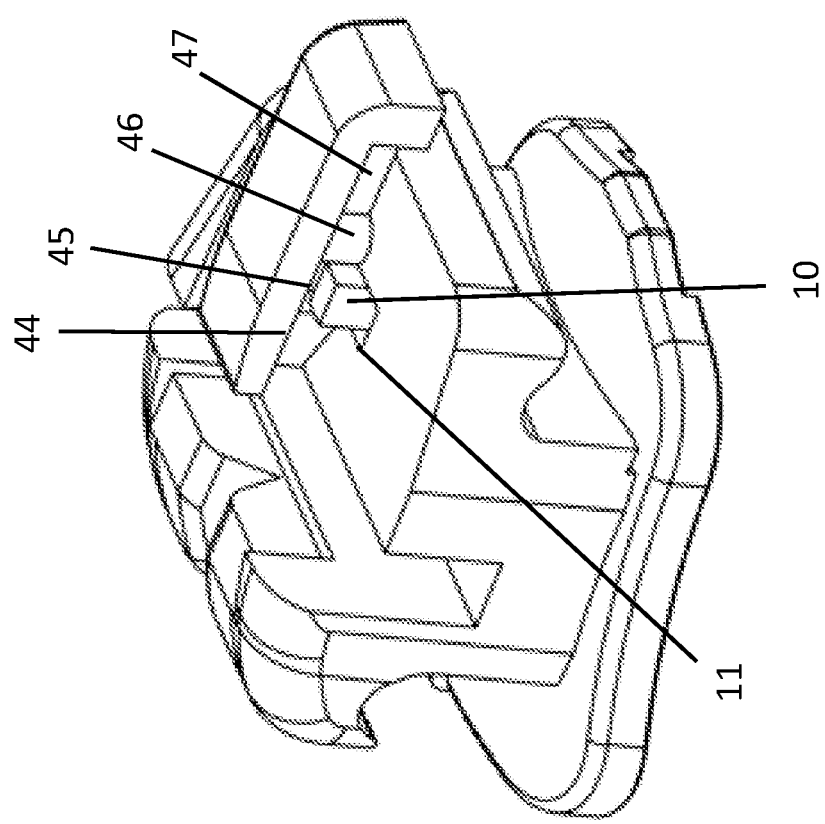
FIG. 42 shows an example of a perspective view of a self-ligating bracket with a cantilever locking blade, with a transversal sectional view of the ligating sliding member in the open position, in accordance with aspects of the present invention.

For example, as shown in FIG. 42, the ligating sliding member (5) may be moved (e.g., in direction [D2] as shown in FIG. 40), such that angular wall (44) is past the cantilever locking blade (10), at which point the cantilever locking blade (10) may become locked in the open position indent (45) via the locking blade 10 moving to the first biased position as shown. When the cantilever locking blade (10) is locked in the open position indent (45), the ligating sliding member (5) may thereby be locked in the open position.

As shown in FIG. 43, the ligating sliding member (5) may be moved further, such that the locking protuberance (46) travels past the cantilever locking blade (10). As the locking protuberance (46) moves past the cantilever locking blade (10), the cantilever locking blade (10) may move from the first biased position in the mesial or distal direction. Once the locking protuberance (46) is past the cantilever locking blade (10), the cantilever locking blade (10) may move back to the first biased position and thereby may become locked in the closed position indent (47). When the cantilever locking blade (10) is locked in the closed position indent (47), the ligating sliding member (5) is locked in the closed position.

Figure 44A:
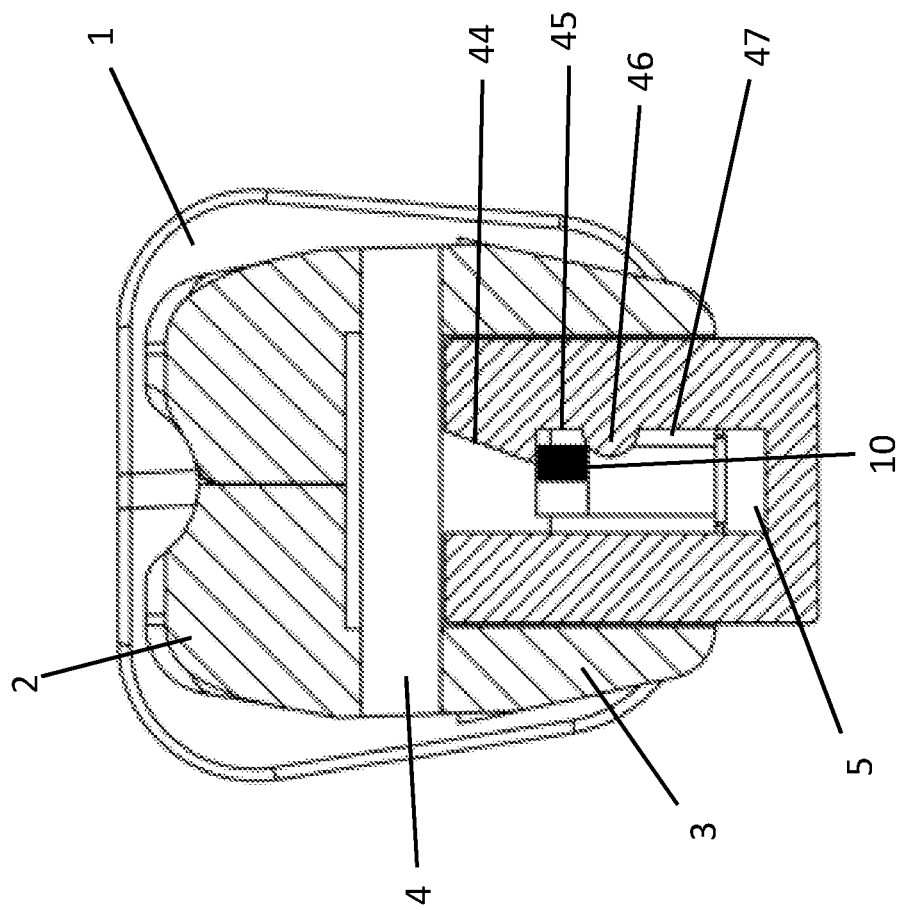
FIG. 44a shows an example of a top sectional view of a self-ligating bracket with a cantilever locking blade with the ligating sliding member in the open position, in accordance with aspects of the present invention.
Figure 44B:
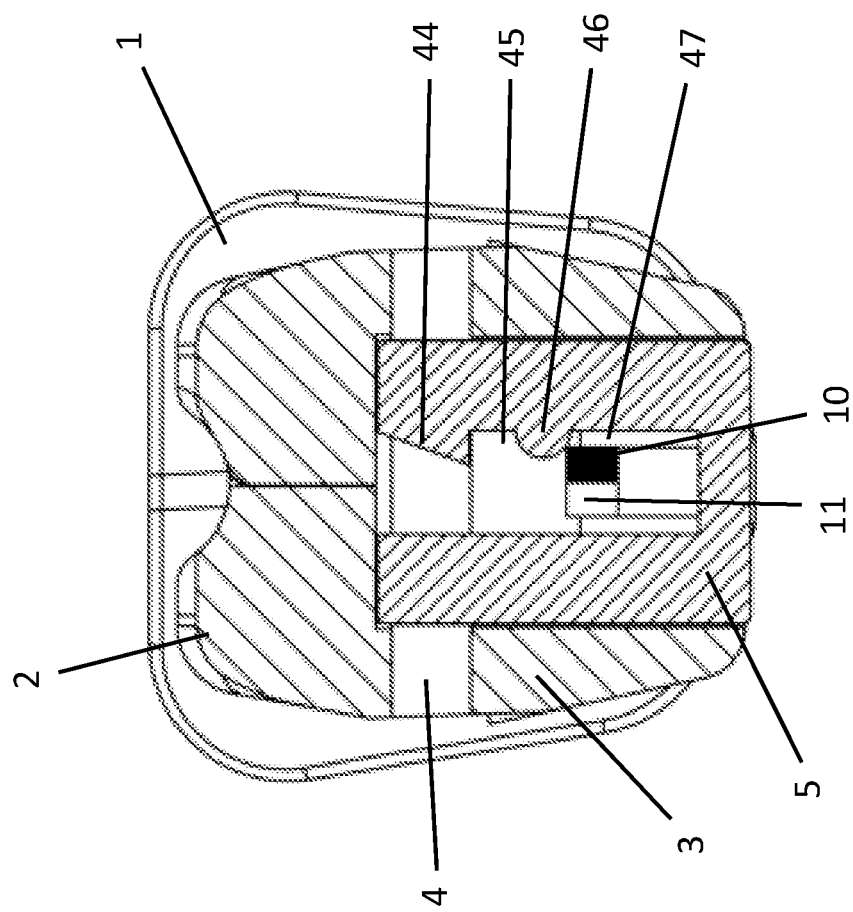
FIG. 44b shows an example of a top sectional view of a self-ligating bracket with a cantilever locking blade with ligating sliding member in the closed position, in accordance with aspects of the present invention.

FIGS. 44a and 44b show a top sectional view of the open and closed positions discussed above, respectively. In particular, FIG. 44a shows the cantilever locking blade (10) locked in open position indent (45), such that the ligating sliding member (5) is locked in the open position. FIG. 44b shows the cantilever locking blade (10) locked in closed position indent (47), such that the ligating sliding member (5) is locked in the closed position.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

REFERENCE KEY FOR FIGURES

1—BONDING BASE
2—UPPER TIE WING
3—LOWER TIE WING
4—ARCHWIRE SLOT
5—SLIDING LIGATING MEMBER
6—THROUGH HOLE
7—"V" CHANNEL
8—PLATFORM
9—BODY OF THE BRACKET
10—CANTILEVER LOCKING BEAM
11—CANTILEVER LOCKING BEAM HOUSING
12—UNDER TIE WING AREA
13—90° LOCKING WALL
14—CONVEX DIVISION AREA
15—CONCAVE HOUSING FOR THE CANTILEVER LOCKING BEAM TAB
16—ARCHWIRE
17—OPENING INSTRUMENT
18—STRAIGHT CANTILEVER LOCKING BEAM
19—STRAIGHT CANTILEVER LOCKING BEAM WITH RECESS
20—CANTILEVER LOCKING BEAM WITH CURVED LOCKING TAB
21—CANTILEVER LOCKING BEAM WITH CURVED LOCKING TAB WITH RECESS
22—"U" Spring Housing
23—"U" Shape Flat Spring
24—Locking recess for Sliding Ligating Member in open position
25—Guiding Channel
26—Locking Triangular Protuberance
27—Locking Cylinder Protuberance
28—Recess for Opening Instrument
29—"U" Shape Spring with Fitting Extension
30—Ligating Sliding Member Beveled Entrance
31—Recessed Sliding Channel
32—Flexed "U" Shape Spring 33—"U" Shape Spring Locked in between the protuberances
34—"U" Shape Spring locked in closed position
35—Flat Spring with inward tabs
36—Locking-Unlocking Protuberance
37—Ligating Sliding Member Locking wedge protuberance
38—Flexible Locking Bridge
39—Upper wedge locking ramp
40—Lower Wedge Locking ramp
41—Ligating Sliding Member rail guide
42—Upper Wedge Locking ramp recess
43—Lower wedge locking ramp recess
44—Angular wall
45—Open position indent
46—Locking protuberance
47—Closed position indent

What is claimed:

1. A self-ligating bracket system comprising:
a body,
an archwire slot for receiving an archwire, and
a locking system,
wherein the locking system comprises a resilient shape cantilever, locking blade and a ligating sliding member, the ligating sliding member having more than one protuberance and the resilient shape cantilever locking blade having a U cross-sectionally shaped locking spring including two arms each having inner and outer extending edges, the two arms being configured to be deflected towards a centerline of the ligating sliding member, by action of the more than one protuberance contacting the outer extending edges of the two arms as the ligating sliding member travels, between an open and closed position,
wherein the resilient shape cantilever locking blade has a first width when the ligating sliding member is in the open position and a second width when the ligating sliding member is in a position proximal the more than one protuberance, the second width being less than the first width.

2. The self-ligating bracket system of claim 1, wherein the more than one protuberance has geometric shape features selected from a triangular, a trapezoidal, a cylinder, and/or a half-cylinder shape, wherein the more than one protuberance secures the ligating sliding member either in the closed or open position.

3. The self-ligating bracket system of claim 1, wherein the resilient shape cantilever blade has the second width when the ligating sliding member is in the closed position.

4. The self-ligating bracket system of claim 1, wherein each of the two arms of the resilient shape cantilever are configured to be deflected contemporaneously towards the centerline of the ligating sliding member by the more than one protuberance as the ligating sliding member travels between an open and closed position.

5. The self-ligating bracket system of claim 1, wherein each of the two arms of the resilient shape cantilever extend in a first pair of directions when undeflected, each of the first pair of directions when undeflected being parallel to a first axial direction of extension of the cantilever locking blade;
wherein the first width and the second width define a distance between the outer edges of the two arms;
wherein a base portion of the cantilever locking blade extends in a second axial direction, the second axial direction being approximately perpendicular to the first axial direction, and wherein the first axial direction and the second axial direction define a first plane; and
wherein the two arms of the cantilever locking blade are configured to flex to a deflected position such that the direction of extension of each of the two arms in the deflected position form an angle less than 90° relative to the first axial direction.

6. The self-ligating bracket system of claim 5, wherein each of the two arms of the resilient shape cantilever is configured to flex so as to deflect in a direction approximately parallel to a normal of the first plane.

7. A self-ligating bracket system comprising:
a bracket body having at least two lower tie wings, at least two upper tie wings, an archwire slot, a ligating sliding member, and a recess parallel to the archwire slot; and
a locking spring having a U cross-sectional shape,
wherein the recess is located between the at least two lower tie wings,
wherein the locking spring comprises at least two arms each having inner and outer extending edges, the two arms being configured to be deflected towards a centerline of the ligating sliding member via the sliding member contacting the outer extending edges of the two arms as the ligating sliding member travels between an open and closed position, and
wherein the locking spring has a first width when the ligating sliding member is in the open position and a second width when the ligating sliding member is in a position between the open position and closed position, the second width being less than the first width.

8. The self-ligating bracket system of claim 7, wherein the ligating sliding member comprises more than one protuberance and wherein the two arms are configured to be deflected by the more than one protuberance as the ligating sliding member travels between the open and closed position.

9. The self-ligating bracket system of claim 7, wherein each of the two arms of the locking spring in extend from a base of the locking spring in a first pair of directions, each of the first pair of directions being parallel to a first axial direction of extension of locking spring,
wherein the locking spring is housed in the recess, the recess including a concave portion bounded by an edge; and
wherein each of the two arms of the locking spring extend in the first axial direction such that a portion of each of the two arms distal from the base of the locking spring extends beyond the edge of the recess.

* * * * *